US010102307B2

(12) United States Patent
Han et al.

(10) Patent No.: US 10,102,307 B2
(45) Date of Patent: Oct. 16, 2018

(54) METHOD AND SYSTEM FOR MULTI-PHASE RANKING FOR CONTENT PERSONALIZATION

(71) Applicant: Yahoo Holdings, Inc., Sunnyvale, CA (US)

(72) Inventors: Yiping Han, Santa Clara, CA (US); Bruno M. Fernandez-Ruiz, Mountain View, CA (US); Jean-Marc Langlois, Menlo Park, CA (US); Jin Lim, Cupertino, CA (US); Scott Gaffney, Palo Alto, CA (US)

(73) Assignee: OATH INC., New York, NY (US)

( * ) Notice: Subject to any disclaimer, the term of this patent is extended or adjusted under 35 U.S.C. 154(b) by 235 days.

(21) Appl. No.: 13/839,169

(22) Filed: Mar. 15, 2013

(65) Prior Publication Data

US 2014/0280214 A1    Sep. 18, 2014

(51) Int. Cl.
G06F 17/30 (2006.01)
H04L 29/08 (2006.01)

(52) U.S. Cl.
CPC .. *G06F 17/30943* (2013.01); *G06F 17/30528* (2013.01); *G06F 17/30867* (2013.01); *G06F 17/3053* (2013.01); *H04L 67/306* (2013.01)

(58) Field of Classification Search
CPC .......... G06Q 30/0269; G06F 17/30867; G06F 17/30699; G06F 17/30; G06F 17/30702; G06F 17/30943; G06F 17/30528; G06F 17/3053; H04L 67/22; H04L 67/306; H04N 21/252; H04N 21/25891; H04N 21/4532; H04N 21/454; H04N 21/466; H04N 21/04
See application file for complete search history.

(56) References Cited

U.S. PATENT DOCUMENTS

| 5,867,799 | A  | * | 2/1999  | Lang et al. |
| 6,389,469 | B1 | * | 5/2002  | Vekslar ................... G06F 9/542 709/219 |
| 6,775,664 | B2 | * | 8/2004  | Lang ................... G06F 17/3061 707/999.001 |
| 6,971,973 | B2 |   | 12/2005 | Cohen et al. |
| 7,620,888 | B2 | * | 11/2009 | Hirst ........................ G06N 5/04 707/999.004 |
| 7,747,568 | B2 | * | 6/2010  | Howell ............. H04L 29/06027 707/610 |

(Continued)

FOREIGN PATENT DOCUMENTS

WO    2012050927 A2    4/2012

OTHER PUBLICATIONS

International Search Report and Written Opinion dated May 26, 2014 in Application No. PCT/US2014/014369.

(Continued)

*Primary Examiner* — Merilyn Nguyen
(74) *Attorney, Agent, or Firm* — Pillsbury Winthrop Shaw Pittman LLP

(57) ABSTRACT

Embodiments of the present teachings disclose method, system, and programs for a multi-phase ranking system for implementation with a personalized content system. The disclosed method, system, and programs utilize a weighted AND system to compute a dot product of the user profile and a content profile in a first phase, a content quality indicator in the second phase and a rules filter in a third phase.

18 Claims, 17 Drawing Sheets

(56) References Cited

U.S. PATENT DOCUMENTS

| | | | | |
|---|---|---|---|---|
| 8,856,168 B2* | 10/2014 | Sayers | ................... | H04L 67/22 |
| | | | | 707/769 |
| 9,015,301 B2* | 4/2015 | Redlich | ................. | G06Q 10/10 |
| | | | | 707/609 |
| 2005/0234897 A1 | 10/2005 | Cheng et al. | | |
| 2007/0214133 A1* | 9/2007 | Liberty | ............... | G06F 17/3064 |
| 2008/0209339 A1* | 8/2008 | Macadaan et al. | .......... | 715/745 |
| 2008/0256059 A1* | 10/2008 | Chang | ................... | G06Q 30/02 |
| 2009/0171813 A1* | 7/2009 | Byrne | ............... | G06F 17/30867 |
| | | | | 705/26.1 |
| 2010/0281025 A1 | 11/2010 | Tsatsou et al. | | |
| 2011/0264508 A1* | 10/2011 | Harik | ................... | G06Q 30/02 |
| | | | | 705/14.42 |
| 2011/0288941 A1* | 11/2011 | Chandra | ............... | G06Q 30/02 |
| | | | | 705/14.73 |
| 2012/0290508 A1 | 11/2012 | Bist | | |
| 2012/0317652 A1* | 12/2012 | Kiley | ................ | G06F 17/30867 |
| | | | | 726/27 |
| 2013/0018896 A1* | 1/2013 | Fleischman | ............ | G06Q 50/01 |
| | | | | 707/748 |
| 2014/0025702 A1* | 1/2014 | Curtiss | ................... | G06Q 50/01 |
| | | | | 707/769 |
| 2014/0215507 A1* | 7/2014 | Wouhaybi | ............. | G06Q 30/02 |
| | | | | 725/14 |
| 2014/0236943 A1* | 8/2014 | Li | ..................... | G06F 17/30699 |
| | | | | 707/736 |

OTHER PUBLICATIONS

International Preliminary Report on Patentability dated Sep. 15, 2015 in International Application PCT/US2014/014369.

Office Action dated Oct. 6, 2015 in Taiwanese Application No. 103109377.

* cited by examiner

System diagram for user understanding unit

METHOD AND SYSTEM FOR MULTI-PHASE RANKING FOR CONTENT PERSONALIZATION

BACKGROUND

Technical Field

The present teaching relates to methods and systems for providing content. Specifically, the present teaching relates to methods and systems for providing online content.

Discussion of Technical Background

The Internet has made it possible for a user to electronically access virtually any content at anytime and from any location. With the explosion of information, it has become more and more important to provide users with information that is relevant to the user and not just information in general. Further, as users of today's society rely on the Internet as their source of information, entertainment, and/or social connections, e.g., news, social interaction, movies, music, etc, it is critical to provide users with information they find valuable.

Efforts have been made to attempt to allow users to readily access relevant and on the point content. For example, topical portals have been developed that are more subject matter oriented as compared to generic content gathering systems such as traditional search engines. Example topical portals include portals on finance, sports, news, weather, shopping, music, art, film, etc. Such topical portals allow users to access information related to subject matters that these portals are directed to. Users have to go to different portals to access content of certain subject matter, which is not convenient and not user centric.

Another line of efforts in attempting to enable users to easily access relevant content is via personalization, which aims at understanding each user's individual likings/interests/preferences so that an individualized user profile for each user can be set up and can be used to select content that matches a user's interests. The underlying goal is to meet the minds of users in terms of content consumption. User profiles traditionally are constructed based on users' declared interests and/or inferred from, e.g., users' demographics. There have also been systems that identify users' interests based on observations made on users' interactions with content. A typical example of such user interaction with content is click through rate (CTR).

These traditional approaches have various shortcomings. For example, users' interests are profiled without any reference to a baseline so that the level of interest can be more accurately estimated. User interests are detected in isolated application settings so that user profiling in individual applications cannot capture a broad range of the overall interests of a user. Such traditional approach to user profiling lead to fragmented representation of user interests without a coherent understanding of the users' preferences. Because profiles of the same user derived from different application settings are often grounded with respect to the specifics of the applications, it is also difficult to integrate them to generate a more coherent profile that better represent the user's interests.

User activities directed to content are traditionally observed and used to estimate or infer users' interests. CTR is the most commonly used measure to estimate users' interests. However, CTR is no longer adequate to capture users' interests particularly given that different types of activities that a user may perform on different types of devices may also reflect or implicate user's interests. In addition, user reactions to content usually represent users's-hort term interests. Such observed short term interests, when acquired piece meal, as traditional approaches often do, can only lead to reactive, rather than proactive, services to users. Although short term interests are important, they are not adequate to enable understanding of the more persistent long term interests of a user, which are crucial in terms of user retention. Most user interactions with content represent short term interests of the user so that relying on such short term interest behavior makes it difficult to expand the understanding of the increasing range of interests of the user. When this is in combination with the fact that such collected data is always the past behavior and collected passively, it creates a personalization bubble, making it difficult, if not impossible, to discover other interests of a user unless the user initiates some action to reveal new interests.

Yet another line of effort to allow users to access relevant content is to pooling content that may be interested by users in accordance with their interests. Given the explosion of information on the Internet, it is not likely, even if possible, to evaluate all content accessible via the Internet whenever there is a need to select content relevant to a particular user. Thus, realistically, it is needed to identify a subset or a pool of the Internet content based on some criteria so that content can be selected from this pool and recommended to users based on their interests for consumption.

Conventional approaches to creating such a subset of content are application centric. Each application carves out its own subset of content in a manner that is specific to the application. For example, Amazon.com may have a content pool related to products and information associated thereof created/updated based on information related to its own users and/or interests of such users exhibited when they interact with Amazon.com. Facebook also has its own subset of content, generated in a manner not only specific to Facebook but also based on user interests exhibited while they are active on Facebook. As a user may be active in different applications (e.g., Amazon.com and Facebook) and with each application, they likely exhibit only part of their overall interests in connection with the nature of the application. Given that, each application can usually gain understanding, at best, of partial interests of users, making it difficult to develop a subset of content that can be used to serve a broader range of users' interests.

Another line of effort is directed to personalized content recommendation, i.e., selecting content from a content pool based on the user's personalized profiles and recommending such identified content to the user. Conventional solutions focus on relevance, i.e., the relevance between the content and the user. Although relevance is important, there are other factors that also impact how recommendation content should be selected in order to satisfy a user's interests. Most content recommendation systems insert advertisement to content identified for a user for recommendation. Some traditional systems that are used to identify insertion advertisements match content with advertisement or user's query (also content) with advertisement, without considering matching based on demographics of the user with features of the target audience defined by advertisers. Some traditional systems match user profiles with the specified demographics of the target audience defined by advertisers but without matching the content to be provided to the user and the advertisement. The reason is that content is often classified into taxonomy based on subject matters covered in the content yet advertisement taxonomy is often based on desired target audience groups. This makes it less effective in terms of selecting the most relevant advertisement to be inserted into content to be recommended to a specific user.

There is a need for improvements over the conventional approaches to personalizing content recommendation.

SUMMARY

The teachings disclosed herein relate to methods, systems, and programming for Multiphase ranking for personalized content. In an embodiment, a method implemented on a computing device having at least one processor, storage, and a communication interface connected to a network for ranking content is disclosed. The method includes obtaining a user profile for a user characterizing the user's interests. Obtaining a content profile for each content piece in a first set of content and a content quality indicator characterizing quality of each piece of content in the first set of content. Estimating an affinity measure between each piece of content in the first set of content and the user based on the user profile and the content profile for the content piece, selecting a second set of content from the first set of content based on the affinity measure for each content piece in the first set of content, filtering the second set of content based on the content quality indicator to generate a third set of content, and outputting the third set of content.

In another embodiment, a system for ranking personalized content is disclosed. The system comprising a user profiler for obtaining a user profiler for a user that characterizes the user's interests, a content profiler for obtaining a content profile for each content piece in a first set of content and a content quality indicator characterizing quality of each piece of content in the first set of content, an estimator for estimating an affinity measure between each piece of content in the first set of content and the user based on the user profile and the content profile for the content piece, a selector for selecting a second set of content from the first set of content based on the affinity measure for each content piece in the first set of content, and a filter for filtering the second set of content based on the content quality indicator to generate a third set of content In another embodiment, a non-transitory computer readable medium having recorded thereon information for ranking personalized content wherein the information, when read by a computer, causes the computer to perform the steps of obtaining a user profile for a user characterizing the user's interests, obtaining a content profile for each content piece in a first set of content and a content quality indicator characterizing quality of each piece of content in the first set of content, estimating an affinity measure between each piece of content in the first set of content and the user based on the user profile and the content profile for the content piece, selecting a second set of content from the first set of content based on the affinity measure for each content piece in the first set of content, filtering the second set of content based on the content quality indicator to generate a third set of content; and outputting the third set of content.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
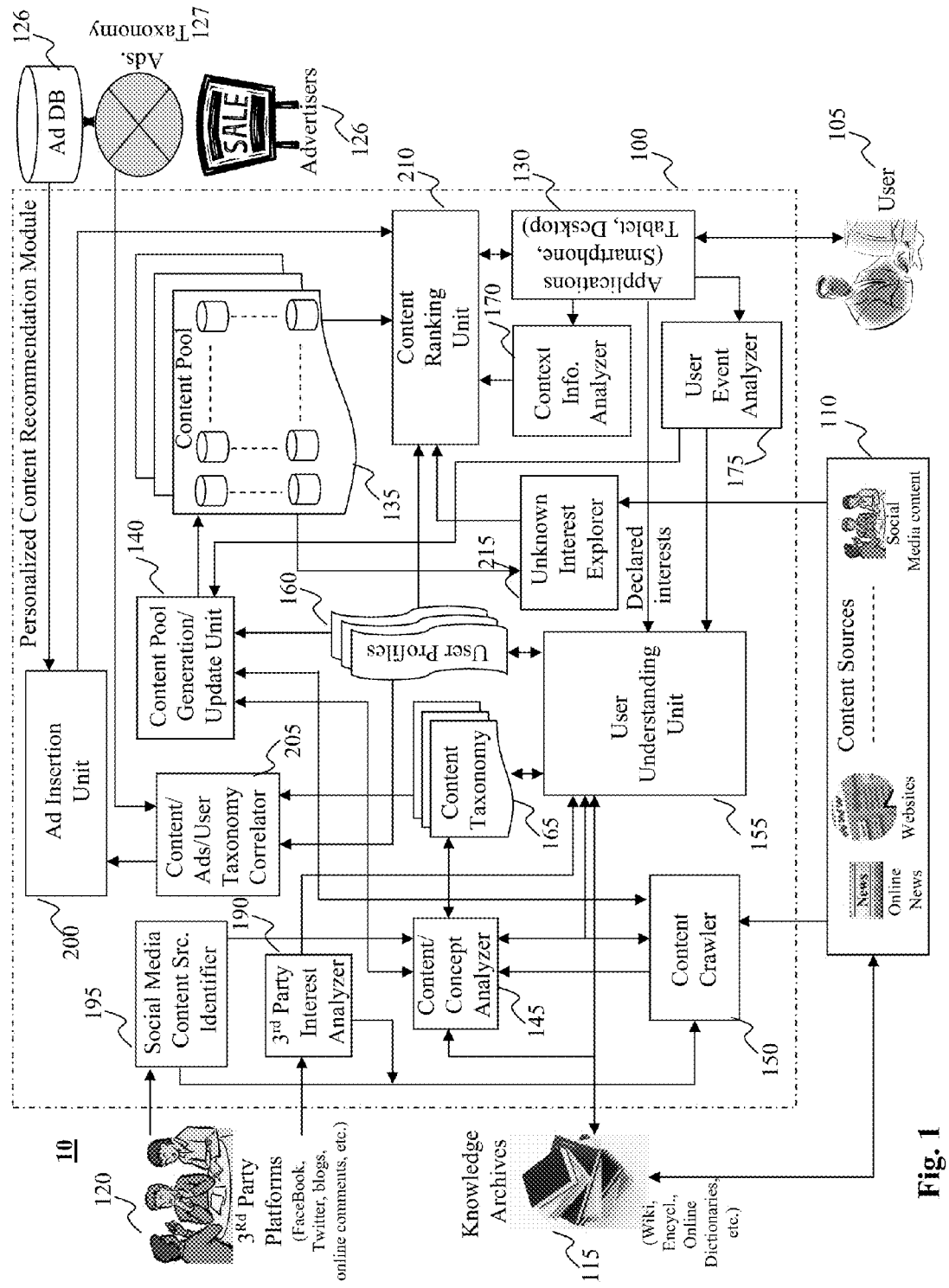
FIG. 1 depicts an exemplary system diagram for personalized content recommendation, according to an embodiment of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The present teaching relates to personalizing on-line content recommendations to a user. Particularly, the present teaching relates to a system, method, and/or programs for personalized content recommendation that addresses the shortcomings associated the conventional content recommendation solutions in personalization, content pooling, and recommending personalized content.

With regard to personalization, the present teaching identifies a user's interests with respect to a universal interest space, defined via known concept archives such as Wikipedia and/or content taxonomy. Using such a universal interest space, interests of users, exhibited in different applications and via different platforms, can be used to establish a general population's profile as a baseline against which individual user's interests and levels thereof can be determined. For example, users active in a third party application such as Facebook or Twitter and the interests that such users exhibited in these third party applications can be all mapped to the universal interest space and then used to compute a baseline interest profile of the general population. Specifically, each user's interests observed with respect to each document covering certain subject matters or concepts can be mapped to, e.g., Wikipedia or certain content taxonomy. A high dimensional vector can be constructed based on the universal interest space in which each attribute of the vector corresponds to a concept in the universal space and the value of the attribute may corresponds to an evaluation of the user's interest in this particular concept. The general baseline interest profile can be derived based on all vectors represent the population. Each vector representing an individual can be normalized against the baseline interest profile so that the relative level of interests of the user with respect to the concepts in the universal interest space can be determined. This enables better understanding of the level of interests of the user in different subject matters with respect to a more general population and result in enhanced personalization for content recommendation. Rather than characterizing users' interests merely according to proprietary content taxonomy, as is often done in the prior art, the present teaching leverages public concept archives, such as Wikipedia or online encyclopedia, to define a universal interest space in order to profile a user's interests in a more coherent manner. Such a high dimensional vector captures the entire interest space of every user, making person-to-person comparison as to personal interests more effective. Profiling a user and in this manner also leads to efficient identification of users who share similar interests. In addition, content may also be characterized in the same universal interest space, e.g., a high dimensional vector against the concepts in the universal interest space can also be constructed with values in the vector indicating whether the content covers each of the concepts in the universal interest space. By characterizing users and content in the same space in a coherent way, the affinity between a user and a piece of content can be determined via, e.g., a dot product of the vector for the user and the vector for the content.

The present teaching also leverages short term interests to better understand long term interests of users. Short term interests can be observed via user online activities and used in online content recommendation, the more persistent long term interests of a user can help to improve content recommendation quality in a more robust manner and, hence, user retention rate. The present teaching discloses discovery of long term interests as well as short term interests.

To improve personalization, the present teaching also discloses ways to improve the ability to estimate a user's interest based on a variety of user activities. This is especially useful because meaningful user activities often occur in different settings, on different devices, and in different operation modes. Through such different user activities, user engagement to content can be measured to infer users' interests. Traditionally, clicks and click through rate (CTR) have been used to estimate users' intent and infer users' interests. CTR is simply not adequate in today's world. Users may dwell on a certain portion of the content, the dwelling may be for different lengths of time, users may scroll along the content and may dwell on a specific portion of the content for some length of time, users may scroll down at different speeds, users may change such speed near certain portions of content, users may skip certain portion of content, etc. All such activities may have implications as to users' engagement to content. Such engagement can be utilized to infer or estimate a user's interests. The present teaching leverages a variety of user activities that may occur across different device types in different settings to achieve better estimation of users' engagement in order to enhance the ability of capturing a user's interests in a more reliable manner.

Another aspect of the present teaching with regard to personalization is its ability to explore unknown interests of a user by generating probing content. Traditionally, user profiling is based on either user provided information (e.g., declared interests) or passively observed past information such as the content that the user has viewed, reactions to such content, etc. Such prior art schemes can lead to a personalization bubble where only interests that the user revealed can be used for content recommendation. Because of that, the only user activities that can be observed are directed to such known interests, impeding the ability to understand the overall interest of a user. This is especially so considering the fact that users often exhibit different interests (mostly partial interests) in different application settings. The present teaching discloses ways to generate probing content with concepts that is currently not recognized as one of the user's interests in order to explore the user's unknown interests. Such probing content is selected and recommended to the user and user activities directed to the probing content can then be analyzed to estimate whether the user has other interests. The selection of such probing content may be based on a user's current known interests by, e.g., extrapolating the user's current interests. For example, for some known interests of the user (e.g., the short term interests at the moment), some probing concepts in the universal interest space, for which the user has not exhibited interests in the past, may be selected according to some criteria (e.g., within a certain distance from the user's current known interest in a taxonomy tree) and content related to such probing concepts may then be selected and recommended to the user. Another way to identify probing concept (corresponding to unknown interest of the user) may be through the user's cohorts. For instance, a user may share certain interests with his/her cohorts but some members of the circle may have some interests that the user has never exhibited before. Such un-shared interests with cohorts may be selected as probing unknown interests for the user and content related to such probing unknown interests may then be selected as probing content to be recommended to the user. In this manner, the present teaching discloses a scheme by which a user's interests can be continually probed and understood to improve the quality of personalization. Such managed probing can also be combined with random selection of probing content to allow discovery of unknown interests of the user that are far removed from the user's current known interests.

A second aspect of recommending quality personalized content is to build a content pool with quality content that covers subject matters interesting to users. Content in the content pool can be rated in terms of the subject and/or the performance of the content itself. For example, content can be characterized in terms of concepts it discloses and such a characterization may be generated with respect to the universal interest space, e.g., defined via concept archive(s) such as content taxonomy and/or Wikipedia and/or online encyclopedia, as discussed above. For example, each piece of content can be characterized via a high dimensional vector with each attribute of the vector corresponding to a concept in the interest universe and the value of the attribute indicates whether and/or to what degree the content covers the concept. When a piece of content is characterized in the same universal interest space as that for user's profile, the affinity between the content and a user profile can be efficiently determined.

Each piece of content in the content pool can also be individually characterized in terms of other criteria. For example, performance related measures, such as popularity of the content, may be used to describe the content. Performance related characterizations of content may be used in both selecting content to be incorporated into the content pool as well as selecting content already in the content pool for recommendation of personalized content for specific users. Such performance oriented characterizations of each piece of content may change over time and can be assessed periodically and can be done based on users' activities. Content pool also changes over time based on various reasons, such as content performance, change in users' interests, etc. Dynamically changed performance characterization of content in the content pool may also be evaluated periodically or dynamically based on performance measures of the content so that the content pool can be adjusted over time, i.e., by removing low performance content pieces, adding new content with good performance, or updating content.

To grow the content pool, the present teaching discloses ways to continually discover both new content and new content sources from which interesting content may be accessed, evaluated, and incorporated into the content pool. New content may be discovered dynamically via accessing information from third party applications which users use and exhibit various interests. Examples of such third party applications include Facebook, Twitter, Microblogs, or YouTube. New content may also be added to the content pool when some new interest or an increased level of interests in some subject matter emerges or is predicted based on the occurrence of certain (spontaneous) events. One example is the content about the life of Pope Benedict, which in general may not be a topic of interests to most users but likely will be in light of the surprising announcement of Pope Benedict's resignation. Such dynamic adjustment to the content pool aims at covering a dynamic (and likely growing) range of interests of users, including those that are, e.g., exhibited by users in different settings or applications or predicted in light of context information. Such newly discovered content may then be evaluated before it can be selected to be added to the content pool.

Certain content in the content pool, e.g., journals or news, need to be updated over time. Conventional solutions usually update such content periodically based on a fixed schedule. The present teaching discloses the scheme of dynamically determining the pace of updating content in the content pool based on a variety of factors. Content update may be affected by context information. For example, the frequency at which a piece of content scheduled to be updated may be every 2 hours, but this frequency can be dynamically adjusted according to, e.g., an explosive event such as an earthquake. As another example, content from a social group on Facebook devoted to Catholicism may normally be updated daily. When Pope Benedict's resignation made the news, the content from that social group may be updated every hour so that interested users can keep track of discussions from members of this social group. In addition, whenever there are newly identified content sources, it can be scheduled to update the content pool by, e.g., crawling the content from the new sources, processing the crawled content, evaluating the crawled content, and selecting quality new content to be incorporated into the content pool. Such a dynamically updated content pool aims at growing in compatible with the dynamically changing users' interests in order to facilitate quality personalized content recommendation.

Another key to quality personalized content recommendation is the aspect of identifying quality content that meets the interests of a user for recommendation. Previous solutions often emphasize mere relevance of the content to the user when selecting content for recommendation. In addition, traditional relevance based content recommendation was mostly based on short term interests of the user. This not only leads to a content recommendation bubble, i.e., known short interests cause recommendations limited to the short term interests and reactions to such short term interests centric recommendations cycle back to the short term interests that start the process. This bubble makes it difficult to come out of the circle to recommend content that can serve not only the overall interests but also long term interests of users. The present teaching combines relevance with performance of the content so that not only relevant but also quality content can be selected and recommended to users in a multi-stage ranking system.

In addition, to identify recommended content that can serve a broad range of interests of a user, the present teaching relies on both short term and long term interests of the user to identify user-content affinity in order to select content that meets a broader range of users' interests to be recommended to the user.

In content recommendation, monetizing content such as advertisements are usually also selected as part of the recommended content to a user. Traditional approaches often select ads based on content in which the ads are to be inserted. Some traditional approaches also rely on user input such as queries to estimate what ads likely can maximize the economic return. These approaches select ads by matching the taxonomy of the query or the content retrieved based on the query with the content taxonomy of the ads. However, content taxonomy is commonly known not to correspond with advertisement taxonomy, which advertisers use to target at certain audience. As such, selecting ads based on content taxonomy does not serve to maximize the economic return of the ads to be inserted into content and recommended to users. The present teaching discloses method and system to build a linkage between content taxonomy and advertisement taxonomy so that ads that are not only relevant to a user's interests but also the interests of advertisers can be selected. In this way, the recommended content with ads to a user can both serve the user's interests and at the same time to allow the content operator to enhance monetization via ads.

Yet another aspect of personalized content recommendation of the present teaching relates to recommending probing content that is identified by extrapolating the currently known user interests. Traditional approaches rely on selecting either random content beyond the currently known user interests or content that has certain performance such as a high level of click activities. Random selection of probing content presents a low possibility to discover a user's unknown interests. Identifying probing content by choosing content for which a higher level of activities are observed is also problematic because there can be many pieces of content that a user may potentially be interested but there is a low level of activities associated therewith. The present teaching discloses ways to identify probing content by extrapolating the currently known interest with the flexibility of how far removed from the currently known interests. This approach also incorporates the mechanism to identify quality probing content so that there is an enhanced likelihood to discover a user's unknown interests. The focus of interests at any moment can be used as an anchor interest based on which probing interests (which are not known to be interests of the user) can be extrapolated from the anchor interests and probing content can be selected based on the probing interests and recommended to the user together with the content of the anchor interests. Probing interests/content may also be determined based on other considerations such as locale, time, or device type. In this way, the disclosed personalized content recommendation system can continually explore and discover unknown interests of a user to understand better the overall interests of the user in order to expand the scope of service.

Additional novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

FIG. 1 depicts an exemplary system diagram 10 for personalized content recommendation to a user 105, according to an embodiment of the present teaching. System 10 comprises a personalized content recommendation module 100, which comprises numerous sub modules, content sources 110, knowledge archives 115, third party platforms 120, and advertisers 125 with advertisement taxonomy 127 and advertisement database 126. Content sources 110 may be any source of on-line content such as on-line news, published papers, blogs, on-line tabloids, magazines, audio content, image content, and video content. It may be content from content provider such as Yahoo! Finance, Yahoo! Sports, CNN, and ESPN. It may be multi-media content or text or any other form of content comprised of website content, social media content, such as Facebook, twitter, Reddit, etc, or any other content rich provider. It may be licensed content from providers such AP and Reuters. It may also be content crawled and indexed from various sources on the Internet. Content sources 110 provide a vast array of content to the personalized content recommendation module 100 of system 10.

Knowledge archives 115 may be an on-line encyclopedia such as Wikipedia or indexing system such as an on-line dictionary. On-line concept archives 115 may be used for its content as well as its categorization or indexing systems. Knowledge archives 115 provide extensive classification system to assist with the classification of both the user's 105 preferences as well as classification of content. Knowledge concept archives, such as Wikipedia may have hundreds of thousands to millions of classifications and sub-classifications. A classification is used to show the hierarchy of the category. Classifications serve two main purposes. First they help the system understand how one category relates to another category and second, they help the system maneuver between higher levels on the hierarchy without having to move up and down the subcategories. The categories or classification structure found in knowledge archives 115 is used for multidimensional content vectors as well as multidimensional user profile vectors which are utilized by personalized content recommendation module 100 to match personalized content to a user 105. Third party platforms 120 maybe any third party applications including but not limited to social networking sites like Facebook, Twitter, LinkedIn, Google+. It may include third party mail servers such as GMail or Bing Search. Third party platforms 120 provide both a source of content as well as insight into a user's personal preferences and behaviors.

Advertisers 125 are coupled with the ad content database 126 as well as an ads classification system or ad. taxonomy 127 intended for classified advertisement content. Advertisers 125 may provide streaming content, static content, and sponsored content. Advertising content may be placed at any location on a personalized content page and may be presented both as part of a content stream as well as a standalone advertisement, placed strategically around or within the content stream.

Personalized content recommendation module 100 comprises applications 130, content pool 135, content pool generation/update unit 140, concept/content analyzer 145, content crawler 150, unknown interest explorer 215, user understanding unit 155, user profiles 160, content taxonomy 165, context information analyzer 170, user event analyzer 175, third party interest analyzer 190, social media content source identifier 195, advertisement insertion unit 200 and content/advertisement/taxonomy correlator 205. These components are connected to achieve personalization, content pooling, and recommending personalized content to a user. For example, the content ranking unit 210 works in connection with context information analyzer 170, the unknown interest explorer 215, and the ad insertion unit 200 to generate personalized content to be recommended to a user with personalized ads or probing content inserted. To achieve personalization, the user understanding unit 155 works in connection with a variety of components to dynamically and continuously update the user profiles 160, including content taxonomy 165, the knowledge archives 115, user event analyzer 175, and the third party interest analyzer 190. Various components are connected to continuously maintain a content pool, including the content pool generation/update unit 140, user event analyzer 175, social media content source identifier 195, content/concept analyzer 145, content crawler 150, the content taxonomy 165, as well as user profiles 160.

Personalized content recommendation module 100 is triggered when user 105 engages with system 10 through applications 130. Applications 130 may receive information in the form of a user id, cookies, log in information from user 105 via some form of computing device. User 105 may access system 10 via a wired or wireless device and may be stationary or mobile. User 105 may interface with the applications 130 on a tablet, a Smartphone, a laptop, a desktop or any other computing device which may be embedded in devices such as watches, eyeglasses, or vehicles. In addition to receiving insights from the user 105 about what information the user 105 might be interested, applications 130 provides information to user 105 in the form of personalized content stream. User insights might be user search terms entered to the system, declared interests, user clicks on a particular article or subject, user dwell time or scroll over of particular content, user skips with respect to some content, etc. User insights may be a user indication of a like, a share, or a forward action on a social networking site, such as Facebook, or even peripheral activities such as print or scan of certain content. All of these user insights or events are utilized by the personalized content recommendation module 100 to locate and customize content to be presented to user 105. User insights received via applications 130 are used to update personalized profiles for users which may be stored in user profiles 160. User profiles 160 may be database or a series of databases used to store personalized user information on all the users of system 10. User profiles 160 may be a flat or relational database and may be stored in one or more locations. Such user insights may also be used to determine how to dynamically update the content in the content pool 135.

A specific user event received via applications 130 is passed along to user event analyzer 175, which analyzes the user event information and feeds the analysis result with event data to the user understanding unit 155 and/or the content pool generation/update unit 140. Based on such user event information, the user understanding unit 155 estimates short term interests of the user and/or infer user's long term interests based on behaviors exhibited by user 105 over long or repetitive periods. For example, a long term interest may be a general interest in sports, where as a short term interest may be related to a unique sports event, such as the Super Bowl at a particular time. Over time, a user's long term interest may be estimated by analyzing repeated user events. A user who, during every engagement with system 10, regularly selects content related to the stock market may be considered as having a long term interest in finances. In this case, system 10 accordingly, may determine that personalized content for user 105 should contain content related to finance. Contrastingly, short term interest may be determined based on user events which may occur frequently over a short period, but which is not something the user 105 is interested in the long term. For example, a short term interest may reflect the momentary interest of a user which may be triggered by something the user saw in the content but such an interest may not persist over time. Both short and long term interest are important in terms of identifying content that meets the desire of the user 105, but need to be managed separately because of the difference in their nature as well as how they influence the user.

In some embodiments, short term interests of a user may be analyzed to predict the user's long term interests. To retain a user, it is important to understand the user's persistent or long term interests. By identifying user 105's short term interest and providing him/her with a quality personalized experience, system 10 may convert an occasional user into a long term user. Additionally, short term interest may trend into long term interest and vice versa. The user understanding unit 155 provides the capability of estimating both short and long term interests.

The user understanding unit 155 gathers user information from multiple sources, including all the user's events, and creates one or more multidimensional personalization vectors. In some embodiments, the user understanding unit 155 receives inferred characteristics about the user 105 based on the user events, such as the content he/she views, self declared interests, attributes or characteristics, user activities, and/or events from third party platforms. In an embodiment, the user understanding unit 155 receives inputs from social media content source identifier 195. Social media content source identifier 195 relies on user 105's social media content to personalize the user's profile. By analyzing the user's social media pages, likes, shares, etc, social media content source identifier 195 provides information for user understanding unit 155. The social media content source identifier 195 is capable of recognizing new content sources by identifying, e.g., quality curators on social media platforms such as Twitter, Facebook, or blogs, and enables the personalized content recommendation module 100 to discover new content sources from where quality content can be added to the content pool 135. The information generated by social media content source identifier 195 may be sent to a content/concept analyzer 145 and then mapped to specific category or classification based on content taxonomy 165 as well as a knowledge archives 115 classification system.

The third party interest analyzer 190 leverages information from other third party platforms about users active on such third party platforms, their interests, as well as content these third party users to enhance the performance of the user understanding unit 155. For example, when information about a large user population can be accessed from one or more third party platforms, the user understanding unit 155 can rely on data about a large population to establish a baseline interest profile to make the estimation of the interests of individual users more precise and reliable, e.g., by comparing interest data with respect to a particular user with the baseline interest profile which will capture the user's interests with a high level of certainty.

When new content is identified from content source 110 or third party platforms 120, it is processed and its concepts are analyzed. The concepts can be mapped to one or more categories in the content taxonomy 165 and the knowledge archives 115. The content taxonomy 165 is an organized structure of concepts or categories of concepts and it may contain a few hundred classifications of a few thousand. The knowledge archives 115 may provide millions of concepts, which may or may not be structures in a similar manner as the content taxonomy 165. Such content taxonomy and knowledge archives may serve as a universal interest space. Concepts estimated from the content can be mapped to a universal interest space and a high dimensional vector can be constructed for each piece of content and used to characterize the content. Similarly, for each user, a personal interest profile may also be constructed, mapping the user's interests, characterized as concepts, to the universal interest space so that a high dimensional vector can be constructed with the user's interests levels populated in the vector.

Content pool 135 may be a general content pool with content to be used to serve all users. The content pool 135 may also be structured so that it may have personalized content pool for each user. In this case, content in the content pool is generated and retained with respect to each individual user. The content pool may also be organized as a tiered system with both the general content pool and personalized individual content pools for different users. For example, in each content pool for a user, the content itself may not be physically present but is operational via links, pointers, or indices which provide references to where the actual content is stored in the general content pool.

Content pool 135 is dynamically updated by content pool generation/update module 140. Content in the content pool comes and go and decisions are made based on the dynamic information of the users, the content itself, as well as other types of information. For example, when the performance of content deteriorates, e.g., low level of interests exhibited from users, the content pool generation/update unit 140 may decide to purge it from the content pool. When content becomes stale or outdated, it may also be removed from the content pool. When there is a newly detected interest from a user, the content pool generation/update unit 140 may fetch new content aligning with the newly discovered interests. User events may be an important source of making observations as to content performance and user interest dynamics. User activities are analyzed by the user event analyzer 175 and such Information is sent to the content pool generation/update unit 140. When fetching new content, the content pool generation/update unit 140 invokes the content crawler 150 to gather new content, which is then analyzed by the content/concept analyzer 145, then evaluated by the content pool generation/update unit 140 as to its quality and performance before it is decided whether it will be included in the content pool or not. Content may be removed from content pool 135 because it is no longer relevant, because other users are not considering it to be of high quality or because it is no longer timely. As content is constantly changing and updating content pool 135 is constantly changing and updating providing user 105 with a potential source for high quality, timely personalized content.

In addition to content, personalized content recommendation module 100 provides for targeted or personalized advertisement content from advertisers 125. Advertisement database 126 houses advertising content to be inserted into a user's content stream. Advertising content from ad database 126 is inserted into the content stream via Content ranking unit 210. The personalized selection of advertising content can be based on the user's profile. Content/advertisement/user taxonomy correlator 205 may re-project or map a separate advertisement taxonomy 127 to the taxonomy associated with the user profiles 160. Content/advertisement/user taxonomy correlator 205 may apply a straight mapping or may apply some intelligent algorithm to the re-projection to determine which of the users may have a similar or related interest based on similar or overlapping taxonomy categories.

Content ranking unit 210 generates the content stream to be recommended to user 105 based on content, selected from content pool 135 based on the user's profile, as well as advertisement, selected by the advertisement insertion unit 200. The content to be recommended to the user 105 may also be determined, by the content ranking unit 210, based on information from the context information analyzer 170. For example, if a user is currently located in a beach town which differs from the zip code in the user's profile, it can be inferred that the user may be on vacation. In this case, information related to the locale where the user is currently in may be forwarded from the context information analyzer to the Content ranking unit 210 so that it can select content that not only fit the user's interests but also is customized to the locale. Other context information include day, time, and device type. The context information can also include an event detected on the device that the user is currently using such as a browsing event of a website devoted to fishing. Based on such a detected event, the momentary interest of the user may be estimated by the context information analyzer 170, which may then direct the Content ranking unit 210 to gather content related to fishing amenities in the locale the user is in for recommendation.

The personalized content recommendation module 100 can also be configured to allow probing content to be included in the content to be recommended to the user 105, even though the probing content does not represent subject matter that matches the current known interests of the user. Such probing content is selected by the unknown interest explorer 215. Once the probing content is incorporated in the content to be recommended to the user, information related to user activities directed to the probing content (including no action) is collected and analyzed by the user event analyzer 175, which subsequently forwards the analysis result to long/short term interest identifiers 180 and 185. If an analysis of user activities directed to the probing content reveals that the user is or is not interested in the probing content, the user understanding unit 155 may then update the user profile associated with the probed user accordingly. This is how unknown interests may be discovered. In some embodiments, the probing content is generated based on the current focus of user interest (e.g., short term) by extrapolating the current focus of interests. In some embodiments, the probing content can be identified via a random selection from the general content, either from the content pool 135 or from the content sources 110, so that an additional probing can be performed to discover unknown interests.

To identify personalized content for recommendation to a user, the content ranking unit 210 takes all these inputs and identify content based on a comparison between the user profile vector and the content vector in a multiphase ranking approach. The selection may also be filtered using context information. Advertisement to be inserted as well as possibly probing content can then be merged with the selected personalized content.

Figure 2:
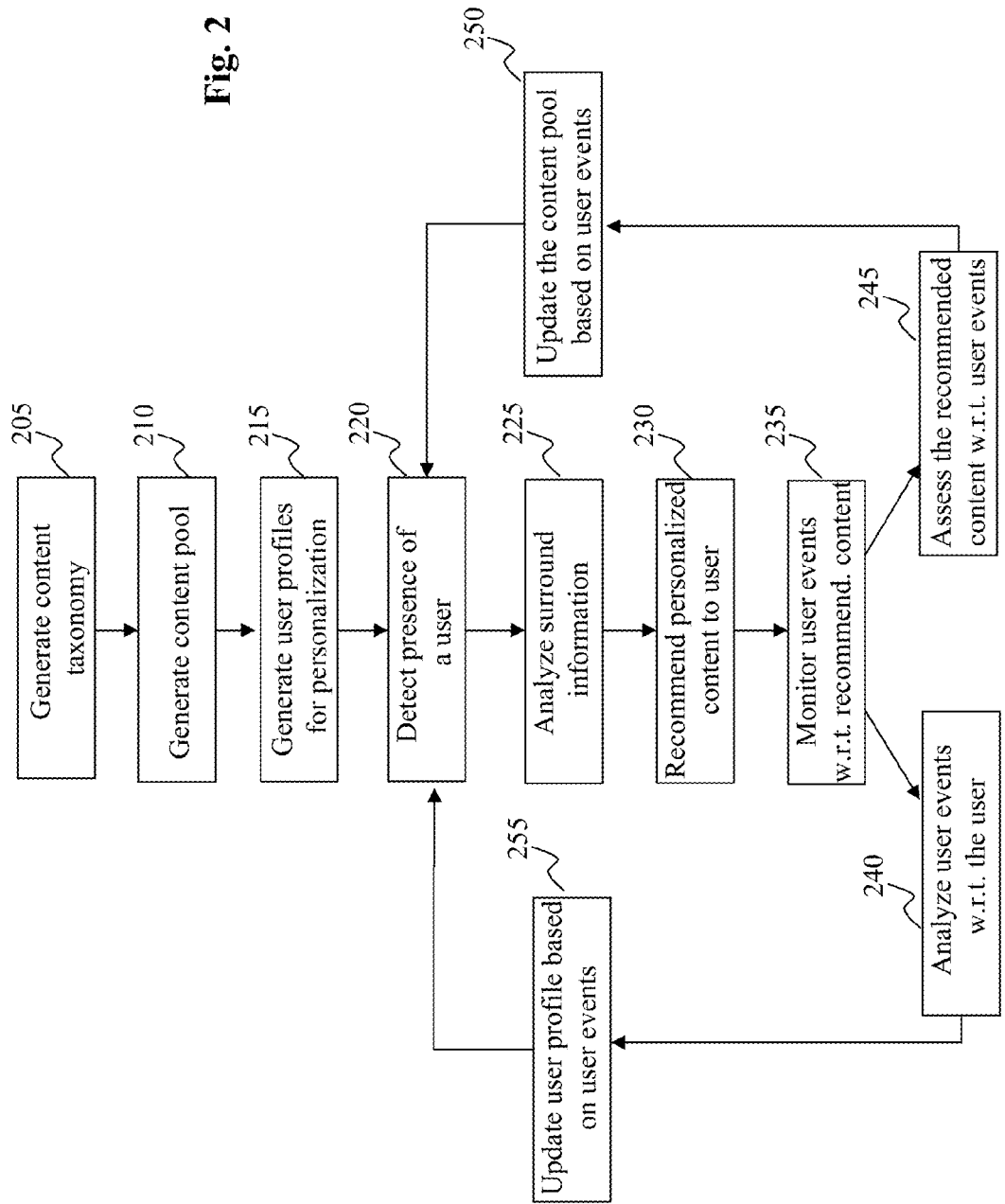
FIG. 2 is a flowchart of an exemplary process for personalized content recommendation, according to an embodiment of the present teaching.
Figure 3:
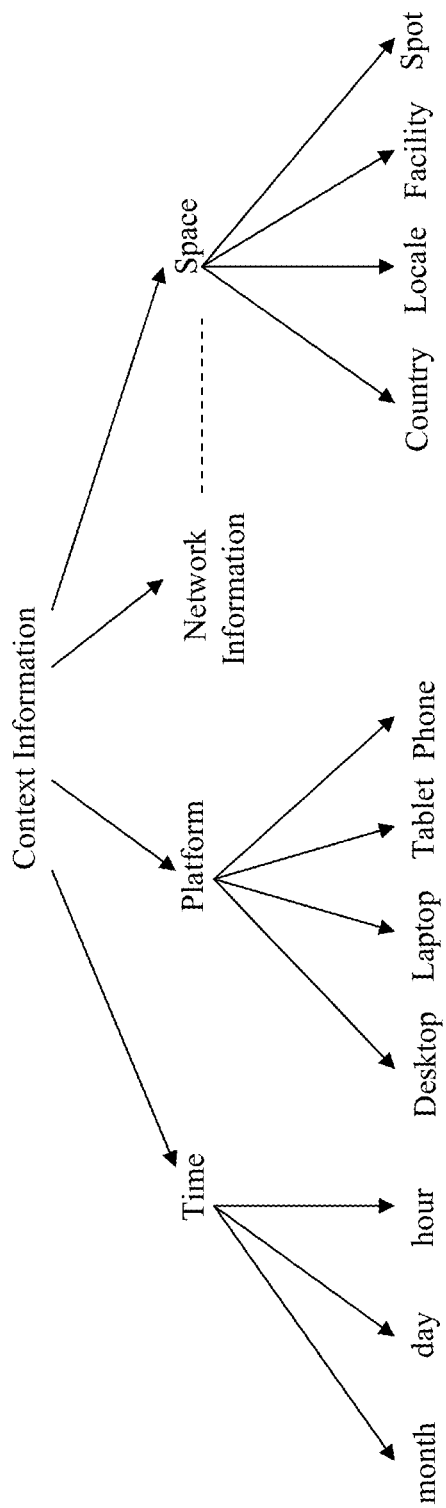
FIG. 3 illustrates exemplary types of context information.

FIG. 2 is a flowchart of an exemplary process for personalized content recommendation, according to an embodiment of the present teaching. Content taxonomy is generated at 205. Content is accessed from different content sources and analyzed and classified into different categories, which can be pre-defined. Each category is given some labels and then different categories are organized into some structure, e.g., a hierarchical structure. A content pool is generated at 210. Different criteria may be applied when the content pool is created. Examples of such criteria include topics covered by the content in the content pool, the performance of the content in the content pool, etc. Sources from which content can be obtained to populate the content pool include content sources 110 or third party platforms 120 such as Facebook, Twitter, blogs, etc. FIG. 3 provides a more detailed exemplary flowchart related to content pool creation, according to an embodiment of the present teaching. User profiles are generated at 215 based on, e.g., user information, user activities, identified short/long term interests of the user, etc. The user profiles may be generated with respect to a baseline population interest profile, established based on, e.g., information about third party interest, knowledge archives, and content taxonomies.

Figure 4:
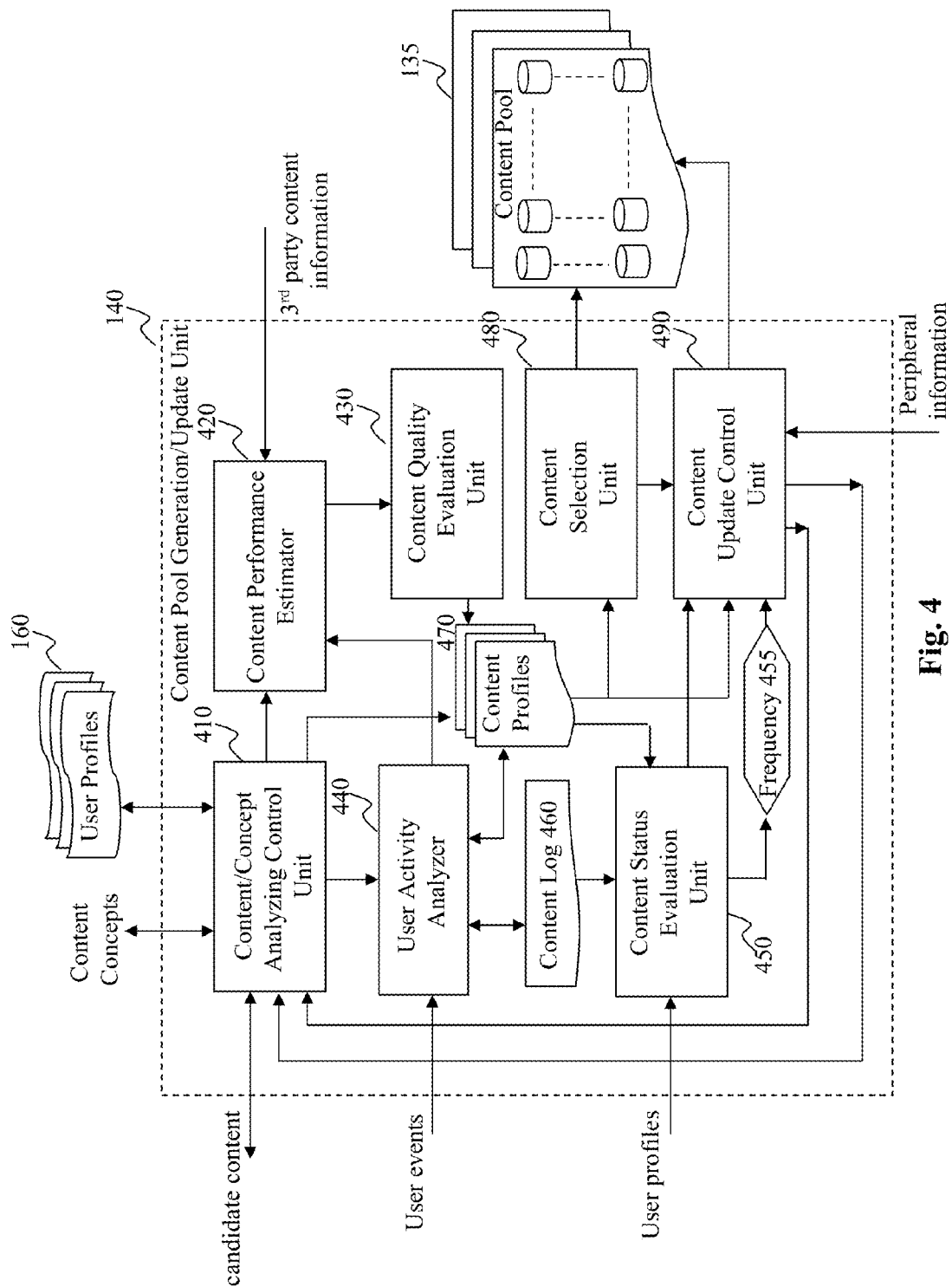
FIG. 4 depicts an exemplary diagram of a content pool generation/update unit, according to an embodiment of the present teaching.

Once the user profiles and the content pool are created, when the system 10 detects the presence of a user, at 220, the context information, such as locale, day, time, may be obtained and analyzed, at 225. FIG. 4 illustrates exemplary types of context information. Based on the detected user's profile, optionally context information, personalized content is identified for recommendation. A high level exemplary flow for generating personalized content for recommendation is presented in FIG. 5. Such gathered personalized content may be ranked and filtered to achieve a reasonable size as to the amount of content for recommendation. Optionally (not shown), advertisement as well as probing content may also be incorporated in the personalized content. Such content is then recommended to the user at 230.

User reactions or activities with respect to the recommended content are monitored, at 235, and analyzed at 240. Such events or activities include clicks, skips, dwell time measured, scroll location and speed, position, time, sharing, forwarding, hovering, motions such as shaking, etc. It is understood that any other events or activities may be monitored and analyzed. For example, when the user moves the mouse cursor over the content, the title or summary of the content may be highlighted or slightly expanded. In anther example, when a user interacts with a touch screen by her/his finger[s], any known touch screen user gestures may be detected. In still another example, eye tracking on the user device may be another user activity that is pertinent to user behaviors and can be detected. The analysis of such user events includes assessment of long term interests of the user and how such exhibited short term interests may influence the system's understanding of the user's long term interests. Information related to such assessment is then forwarded to the user understanding unit 155 to guide how to update, at 255, the user's profile. At the same time, based on the user's activities, the portion of the recommended content that the user showed interests are assessed, at 245, and the result of the assessment is then used to update, at 250, the content pool. For example, if the user shows interests on the probing content recommended, it may be appropriate to update the content pool to ensure that content related to the newly discovered interest of the user will be included in the content pool.

FIG. 3 illustrates different types of context information that may be detected and utilized in assisting to personalize content to be recommended to a user. In this illustration, context information may include several categories of data, including, but not limited to, time, space, platform, and network conditions. Time related information can be time of the year (e.g., a particular month from which season can be inferred), day of a week, specific time of the day, etc. Such information may provide insights as to what particular set of interests associated with a user may be more relevant. To infer the particular interests of a user at a specific moment may also depend on the locale that the user is in and this can be reflected in the space related context information, such as which country, what locale (e.g., tourist town), which facility the user is in (e.g., at a grocery store), or even the spot the user is standing at the moment (e.g., the user may be standing in an aisle of a grocery store where cereal is on display). Other types of context information includes the specific platform related to the user's device, e.g., Smartphone, Tablet, laptop, desktop, bandwidth/data rate allowed on the user's device, which will impact what types of content may be effectively presented to the user. In addition, the network related information such as state of the network where the user's device is connected to, the available bandwidth under that condition, etc. may also impact what content should be recommended to the user so that the user can receive or view the recommended content with reasonable quality.

FIG. 4 depicts an exemplary system diagram of the content pool generation/update unit 140, according to an embodiment of the present teaching. The content pool 135 can be initially generated and then maintained according to the dynamics of the users, contents, and needs detected. In this illustration, the content pool generation/update unit 140 comprises a content/concept analyzing control unit 410, a content performance estimator 420, a content quality evaluation unit 430, a content selection unit 480, which will select appropriate content to place into the content pool 135. In addition, to control how content is to be updated, the content pool generation/update unit 140 also includes a user activity analyzer 440, a content status evaluation unit 450, and a content update control unit 490.

The content/concept analyzing control unit 410 interfaces with the content crawler 150 (FIG. 1) to obtain candidate content that is to be analyzed to determine whether the new content is to be added to the content pool. The content/concept analyzing control unit 410 also interfaces with the content/concept analyzer 145 (see FIG. 1) to get the content analyzed to extract concepts or subjects covered by the content. Based on the analysis of the new content, a high dimensional vector for the content profile can be computed via, e.g., by mapping the concepts extracted from the content to the universal interest space, e.g., defined via Wikipedia or other content taxonomies. Such a content profile vector can be compared with user profiles 160 to determine whether the content is of interest to users. In addition, content is also evaluated in terms of its performance by the content performance estimator 420 based on, e.g., third party information such as activities of users from third party platforms so that the new content, although not yet acted upon by users of the system, can be assessed as to its performance. The content performance information may be stored, together with the content's high dimensional vector related to the subject of the content, in the content profile 470. The performance assessment is also sent to the content quality evaluation unit 430, which, e.g., will rank the content in a manner consistent with other pieces of content in the content pool. Based on such rankings, the content selection unit 480 then determines whether the new content is to be incorporated into the content pool 135.

To dynamically update the content pool 135, the content pool generation/update unit 140 may keep a content log 460 with respect to all content presently in the content pool and dynamically update the log when more information related to the performance of the content is received. When the user activity analyzer 440 receives information related to user events, it may log such events in the content log 460 and perform analysis to estimate, e.g., any change to the performance or popularity of the relevant content over time. The result from the user activity analyzer 440 may also be utilized to update the content profiles, e.g., when there is a change in performance. The content status evaluation unit 450 monitors the content log and the content profile 470 to dynamically determine how each piece of content in the content pool 135 is to be updated. Depending on the status with respect to a piece of content, the content status evaluation unit 450 may decide to purge the content if its performance degrades below a certain level. It may also decide to purge a piece of content when the overall interest level of users of the system drops below a certain level. For content that requires update, e.g., news or journals, the content status evaluation unit 450 may also control the frequency 455 of the updates based on the dynamic information it receives. The content update control unit 490 carries out the update jobs based on decisions from the content status evaluation unit 450 and the frequency at which certain content needs to be updated. The content update control unit 490 may also determine to add new content whenever there is peripheral information indicating the needs, e.g., there is an explosive event and the content in the content pool on that subject matter is not adequate. In this case, the content update control unit 490 analyzes the peripheral information and if new content is needed, it then sends a control signal to the content/concept analyzing control unit 410 so that it can interface with the content crawler 150 to obtain new content.

Figure 5:
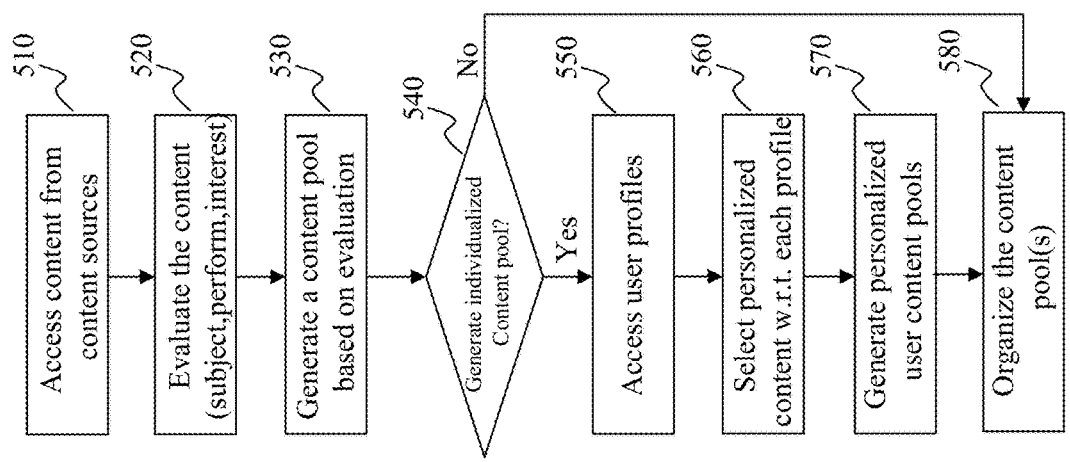
FIG. 5 is a flowchart of an exemplary process of creating a content pool, according to an embodiment of the present teaching.

FIG. 5 is a flowchart of an exemplary process of creating the content pool, according to an embodiment of the present teaching. Content is accessed at 510 from content sources, which include content from content portals such as Yahoo!, general Internet sources such as web sites or FTP sites, social media platforms such as Twitter, or other third party platforms such as Facebook. Such accessed content is evaluated, at 520, as to various considerations such as performance, subject matters covered by the content, and how it fit users' interests. Based on such evaluation, certain content is selected to generate, at 530, the content pool 135, which can be for the general population of the system or can also be further structured to create sub content pools, each of which may be designated to a particular user according to the user's particular interests. At 540, it is determined whether user-specific content pools are to be created. If not, the general content pool 135 is organized (e.g., indexed or categorized) at 580. If individual content pools for individual users are to be created, user profiles are obtained at 550, and with respect to each user profile, a set of personalized content is selected at 560 that is then used to create a sub content pool for each such user at 570. The overall content pool and the sub content pools are then organized at 580.

Figure 6:
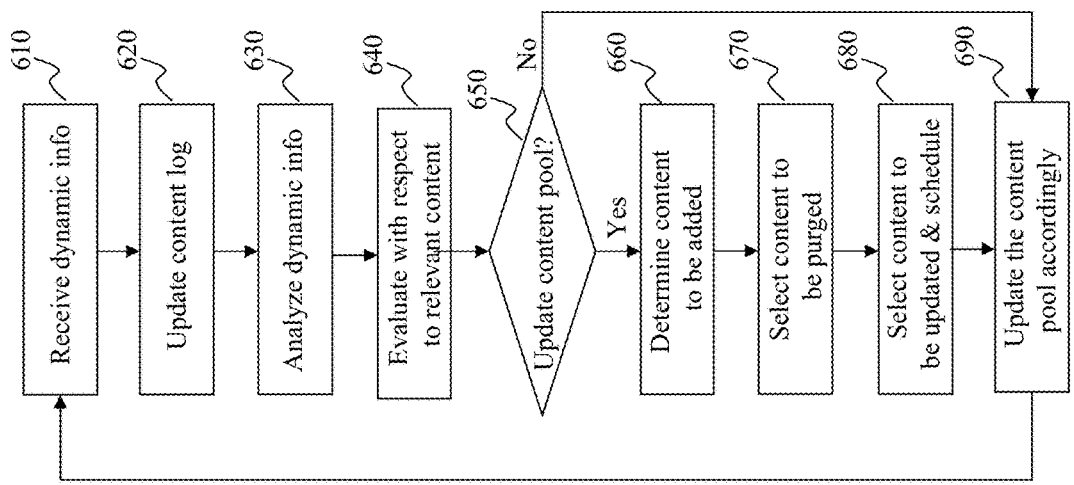
FIG. 6 is a flowchart of an exemplary process for updating a content pool, according to an embodiment of the present teaching.

FIG. 6 is a flowchart of an exemplary process for updating the content pool 135, according to an embodiment of the present teaching. Dynamic information is received at 610 and such information includes user activities, peripheral information, user related information, etc. Based on the received dynamic information, the content log is updated at 620 and the dynamic information is analyzed at 630. Based on the analysis of the received dynamic information, it is evaluated, at 640, with respect to the content implicated by the dynamic information, as to the change of status of the content. For example, if received information is related to user activities directed to specific content pieces, the performance of the content piece may need to be updated to generate a new status of the content piece. It is then determined, at 650, whether an update is needed. For instance, if the dynamic information from a peripheral source indicates that content of certain topic may have a high demand in the near future, it may be determined that new content on that topic may be fetched and added to the content pool. In this case, at 660, content that needs to be added is determined. In addition, if the performance or popularity of a content piece has just dropped below an acceptable level, the content piece may need to be purged from the content pool 135. Content to be purged is selected at 670. Furthermore, when update is needed for regularly refreshed content such as journal or news, the schedule according to which update is made may also be changed if the dynamic information received indicates so. This is achieved at 680.

Figure 7:
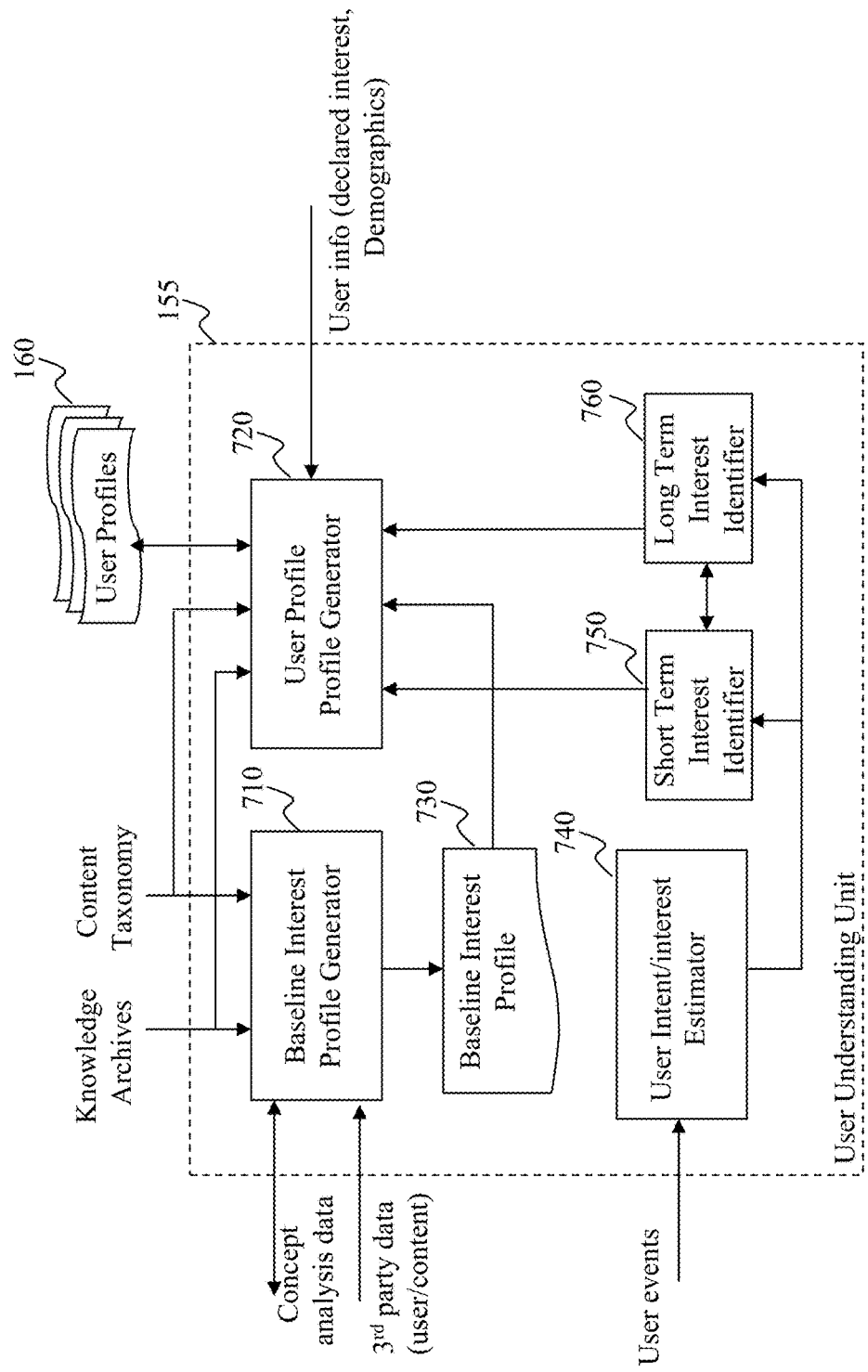
FIG. 7 depicts an exemplary diagram of a user understanding unit, according to an embodiment of the present teaching.

FIG. 7 depicts an exemplary diagram of the user understanding unit 155, according to an embodiment of the present teaching. In this exemplary construct, the user understanding unit 155 comprises a baseline interest profile generator 710, a user profile generator 720, a user intent/interest estimator 740, a short term interest identifier 750 and a long term interest identifier 760. In operation, the user understanding unit 155 takes various input and generates user profiles 160 as output. Its input includes third party data such as users' information from such third party platforms as well as content such users accessed and expressed interests, concepts covered in such third party data, concepts from the universal interest space (e.g., Wikipedia or content taxonomy), information about users for whom the personalized profiles are to be constructed, as well as information related to the activities of such users. Information from a user for whom a personalized profile is to be generated and updated includes demographics of the user, declared interests of the user, etc. Information related to user events includes the time, day, location at which a user conducted certain activities such as clicking on a content piece, long dwell time on a content piece, forwarding a content piece to a friend, etc.

In operation, the baseline interest profile generator 710 access information about a large user population including users' interests and content they are interested in from one or more third party sources (e.g., Facebook). Content from such sources is analyzed by the content/concept analyzer 145 (FIG. 1), which identifies the concepts from such content. When such concepts are received by the baseline interest profile generator 710, it maps such concepts to the knowledge archives 115 and content taxonomy 165 (FIG. 1) and generate one or more high dimensional vectors which represent the baseline interest profile of the user population. Such generated baseline interest profile is stored at 730 in the user understanding unit 155. When there is similar data from additional third party sources, the baseline interest profile 730 may be dynamically updated to reflect the baseline interest level of the growing population.

Once the baseline interest profile is established, when the user profile generator receives user information or information related to estimated short term and long term interests of the same user, it may then map the user's interests to the concepts defined by, e.g., the knowledge archives or content taxonomy, so that the user's interests are now mapped to the same space as the space in which the baseline interest profile is constructed. The user profile generator 720 then compares the user's interest level with respect to each concept with that of a larger user population represented by the baseline interest profile 730 to determine the level of interest of the user with respect to each concept in the universal interest space. This yields a high dimensional vector for each user. In combination with other additional information, such as user demographics, etc., a user profile can be generated and stored in 160.

User profiles 160 are updated continuously based on newly received dynamic information. For example, a user may declare additional interests and such information, when received by the user profile generator 720, may be used to update the corresponding user profile. In addition, the user may be active in different applications and such activities may be observed and information related to them may be gathered to determine how they impact the existing user profile and when needed, the user profile can be updated based on such new information. For instance, events related to each user may be collected and received by the user intent/interest estimator 740. Such events include that the user dwelled on some content of certain topic frequently, that the user recently went to a beach town for surfing competition, or that the user recently participated in discussions on gun control, etc. Such information can be analyzed to infer the user intent/interests. When the user activities relate to reaction to content when the user is online, such information may be used by the short term interest identifier 750 to determine the user's short term interests. Similarly, some information may be relevant to the user's long term interests. For example, the number of requests from the user to search for content related to diet information may provide the basis to infer that the user is interested in content related to diet. In some situations, estimating long term interest may be done by observing the frequency and regularity at which the user accesses certain type of information. For instance, if the user repeatedly and regularly accesses content related to certain topic, e.g., stocks, such repetitive and regular activities of the user may be used to infer his/her long term interests. The short term interest identifier 750 may work in connection with the long term interest identifier 760 to use observed short term interests to infer long term interests. Such estimated short/long term interests are also sent to the user profile generator 720 so that the personalization can be adapted to the changing dynamics.

Figure 8:
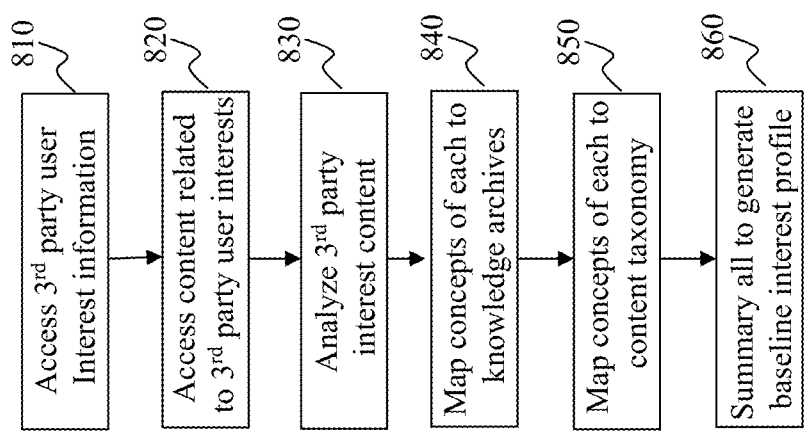
FIG. 8 is a flowchart of an exemplary process for generating a baseline interest profile, according to an embodiment of the present teaching.

FIG. 8 is a flowchart of an exemplary process for generating a baseline interest profile based on information related to a large user population, according to an embodiment of the present teaching. The third party information, including both user interest information as well as their interested content, is accessed at 810 and 820. The content related to the third party user interests is analyzed at 830 and the concepts from such content are mapped, at 840 and 850, to knowledge archives and/or content taxonomy. To build a baseline interest profile, the mapped vectors for third party users are then summarized to generate a baseline interest profile for the population. There can be a variety ways to summarize the vectors to generate an averaged interest profile with respect to the underlying population.

Figure 9:
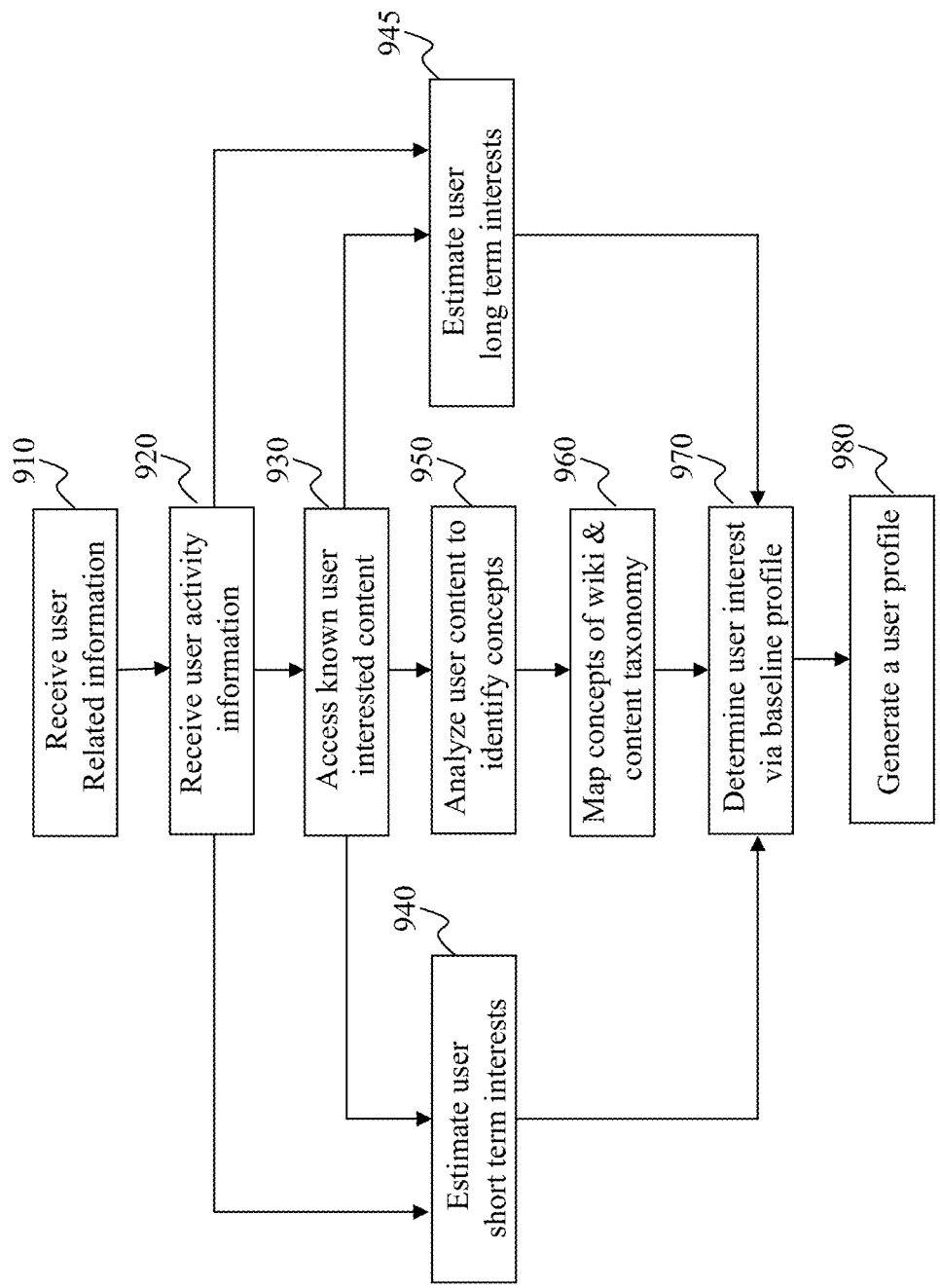
FIG. 9 is a flowchart of an exemplary process for generating a personalized user profile, according to an embodiment of the present teaching.

FIG. 9 is a flowchart of an exemplary process for generating/updating a user profile, according to an embodiment of the present teaching. User information is received first at 910. Such user information includes user demographics, user declared interests, etc. Information related to user activities is also received at 920. Content pieces that are known to be interested by the user are accessed at 930, which are then analyzed, at 950, to extract concepts covered by the content pieces. The extracted concepts are then mapped, at 960, to the universal interest space and compared with, concept by concept, the baseline interest profile to determine, at 970, the specific level of interest of the user given the population. In addition, the level of interests of each user may also be identified based on known or estimated short and long term interests that are estimated, at 940 and 945, respectively, based on user activities or content known to be interested by the user. A personalized user profile can then be generated, at 980, based on the interest level with respect to each concept in the universal interest space.

Figure 10:
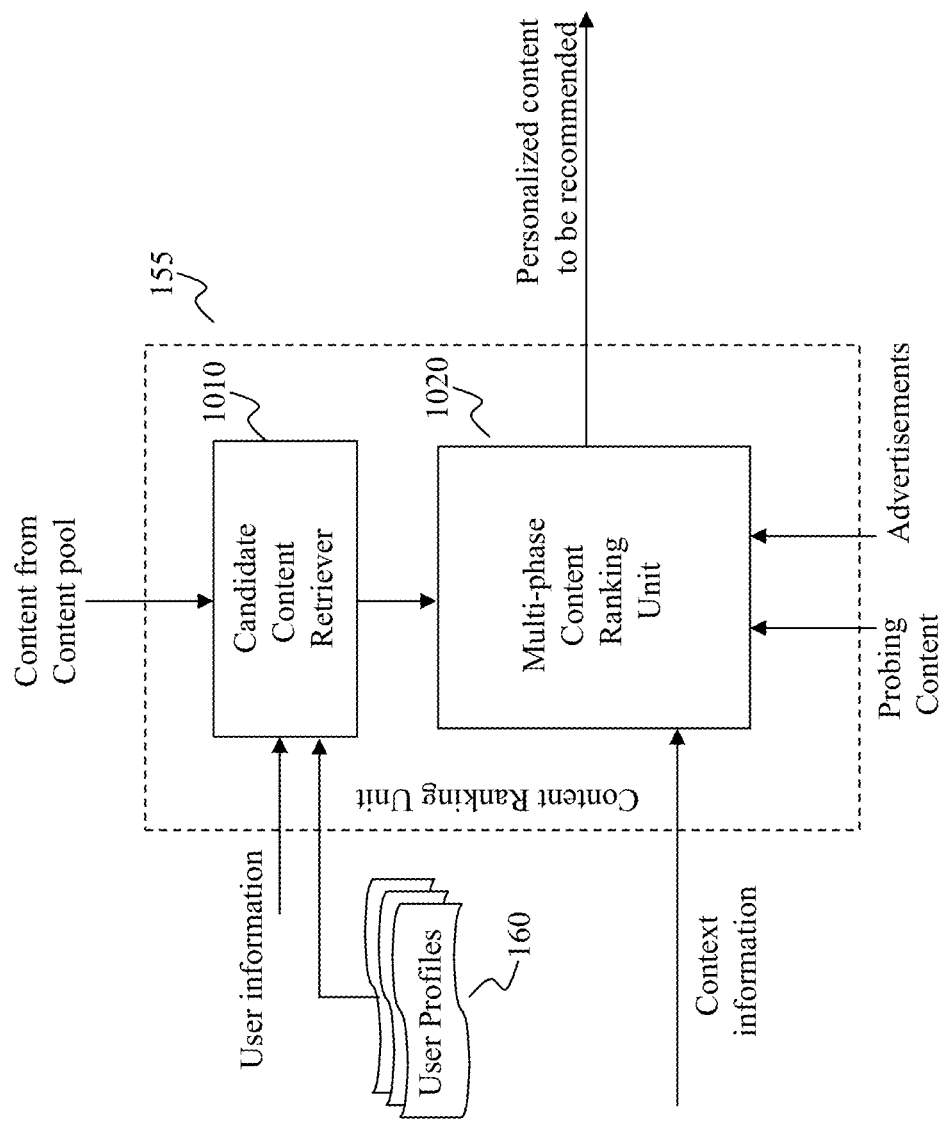
FIG. 10 depicts an exemplary system diagram for a content ranking unit, according to an embodiment of the present teaching.

FIG. 10 depicts an exemplary system diagram for the content ranking unit 210, according to an embodiment of the present teaching. The content ranking unit 210 takes variety of input and generates personalized content to be recommended to a user. The input to the content ranking unit 210 includes user information from the applications 130 with which a user is interfacing, user profiles 160, context information surrounding the user at the time, content from the content pool 135, advertisement selected by the ad insertion unit 200, and optionally probing content from the unknown interest explorer 215. The content ranking unit 210 comprises a candidate content retriever 1010 and a multi-phase content ranking unit 1020. Based on user information from applications 130 and the relevant user profile, the candidate content retriever 1010 determines the content pieces to be retrieved from the content pool 135. Such candidate content may be determined in a manner that is consistent with the user's interests or individualized. In general, there may be a large set of candidate content and it needs to be further determined which content pieces in this set are most appropriate given the context information. The multi-phase content ranking unit 1020 takes the candidate content from the candidate content retriever 1010, the advertisement, and optionally may be the probing content, as a pool of content for recommendation and then performs multiple stages of ranking, e.g., relevance based ranking, performance based ranking, etc. as well as factors related to the context surrounding this recommendation process, and selects a subset of the content to be presented as the personalized content to be recommended to the user.

Figure 11:
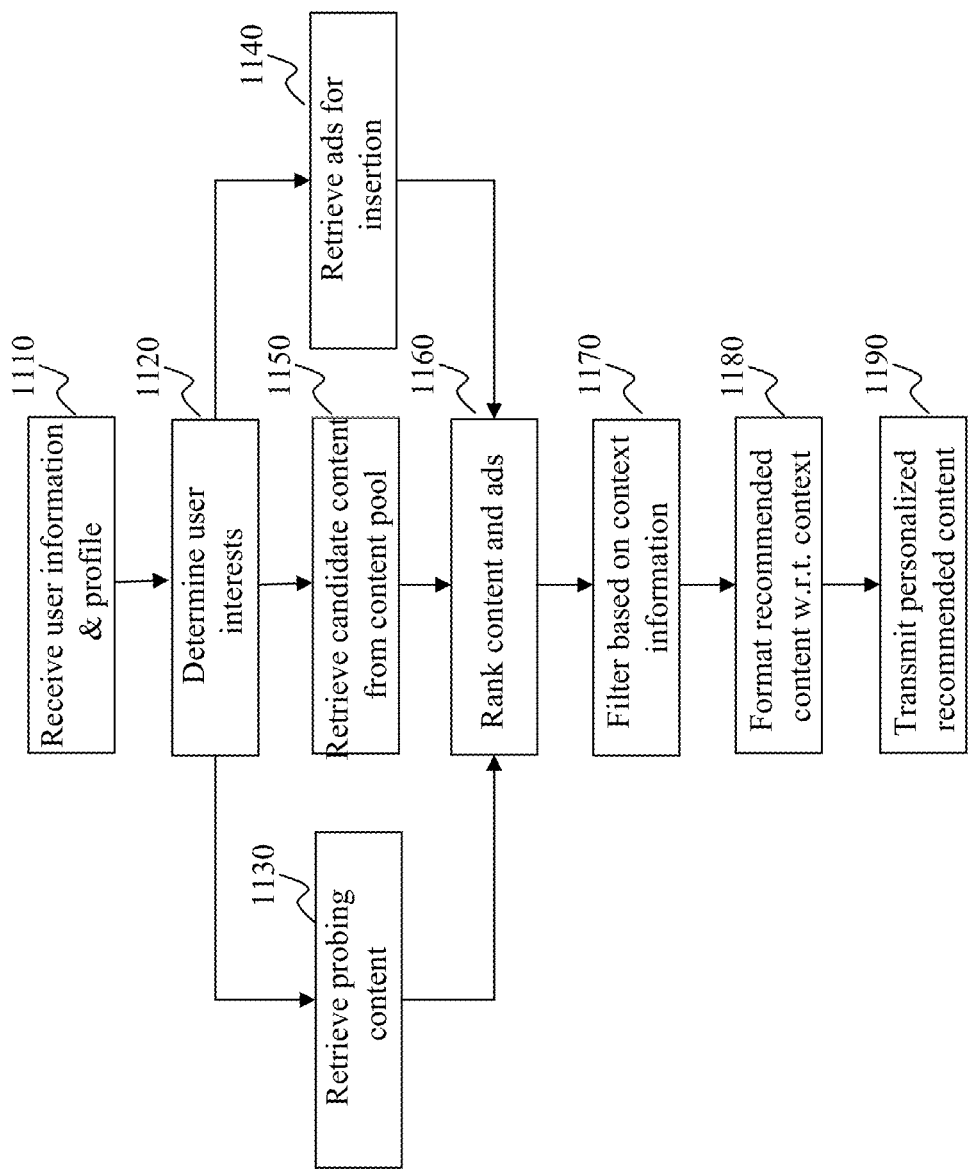
FIG. 11 is a flowchart of an exemplary process for the content ranking unit, according to an embodiment of the present teaching.

FIG. 11 is a flowchart of an exemplary process for the content ranking unit, according to an embodiment of the present teaching. User related information and user profile are received first at 1110. Based on the received information, user's interests are determined at 1120, which can then be used to retrieve, at 1150, candidate content from the content pool 135. The user's interests may also be utilized in retrieving advertisement and/or probing content at 1140 and 1130, respectively. Such retrieved content is to be further ranked, at 1160, in order to select a subset as the most appropriate for the user. As discussed above, the selection takes place in a multi-phase ranking process, each of the phases is directed to some or a combination of ranking criteria to yield a subset of content that is not only relevant to the user as to interests but also high quality content that likely will be interested by the user. The selected subset of content may also be further filtered, at 1170, based on, e.g., context information. For example, even though a user is in general interested in content about politics and art, if the user is currently in Milan, Italy, it is likely that the user is on vacation. In this context, rather than choosing content related to politics, the content related to art museums in Milan may be more relevant. The multi-phase content ranking unit 1020 in this case may filter out the content related to politics based on this contextual information. This yields a final set of personalized content for the user. At 1180, based on the contextual information associated with the surrounding of the user (e.g., device used, network bandwidth, etc.), the content ranking unit packages the selected personalized content, at 1180, in accordance with the context information and then transmits, at 1190, the personalized content to the user.

More detailed disclosures of various aspects of the system 10, particularly the personalized content recommendation module 100, are covered in different U.S. patent applications as well as PCT applications, entitled "Method and System For User Profiling Via Mapping Third Party Interests To A Universal Interest Space", "Method and System for Multi-Phase Ranking For Content Personalization", "Method and System for Measuring User Engagement Using Click/Skip In Content Stream", "Method and System for Dynamic Discovery And Adaptive Crawling of Content From the Internet", "Method and System For Dynamic Discovery of Interesting URLs From Social Media Data Stream", "Method and System for Discovery of User Unknown Interests", "Method and System for Efficient Matching of User Profiles with Audience Segments", "Method and System For Mapping Short Term Ranking Optimization Objective to Long Term Engagement", "Social Media Based Content Selection System", "Method and System For Measuring User Engagement From Stream Depth", "Method and System For Measuring User Engagement Using Scroll Dwell Time", "Almost Online Large Scale Collaborative Based Recommendation System", and "Efficient and Fault-Tolerant Distributed Algorithm for Learning Latent Factor Models through Matrix Factorization". The present teaching is particularly directed to a method and system that relates to multi-phase ranking of on-line content for personalized presentation to a user.

Traditional methods of providing personalized content focused solely on a user interaction such as click-though-rate (CTR) as the determinative factor in deciding if a user liked or did not like the viewed content and generated content for the user based on the user's historical behaviors. Systems fail to look beyond the user's viewing habits and often failed to consider other sources for user interests. Traditional systems further failed to consider the quality of the content in terms of timeliness, general user interest, etc. Accordingly, a system and method is needed that embodies a more comprehensive retrieval and ranking engine that enables efficient matching based on user profiles followed by complex ranking and blending functions and a content flow on top of "weighted 'and-based'" (WAND) matching.

The present disclosure relates to a multi-phase retrieval and ranking engine that enables efficient matching followed by complex ranking and blending functions e.g., gradient-boosted decision trees (GBDT) and Content Features on top of WAND-based matching.

In an embodiment of the personalized content system a multi-phase retrieval and ranking engine enables efficient matching followed by complex ranking and blending functions utilizing, GMP (Gamma Poisson) and/or GBDT (gradient-boosted decision trees) and content features on top of WAND-based matching. In an embodiment, in order to find personalized content for a user, a weighted AND (WAND) operator may be used during a first phase of a multiphase ranking system to generate content recommendations. Such a WAND system may use one or more phases to map personalized content to a user. In an embodiment, a three phase ranking system is used wherein a matching score between a user profile and a document in a content pool is computed by a dot-product of a profile feature vector and a document feature vector. During the first stage of the ranking, all contents in the document pool are evaluated and content-based matching is utilized. Content-based matching, or relevance based matching, is based on matching content documents based on syntactic or semantic similarities. Additionally and/or alternatively, a pool of predetermined user content may be used. The predetermined pool may have been pre-filtered based on other criteria relevant to the specific user. The ranking on the general content pool will return hundreds if not thousands of content candidates for second-stage ranking.

In an embodiment, second-stage ranking is utilized to determinate what contents will be selected from the hundreds or thousands of candidates and recommended to end users. Second stage ranking uses performance-based matching or quality matching to associate documents based on predicted click-ability or quality. Because of the size of the original content pool, this type of complex computation is to computationally intensive and therefore done on the smaller phase 1 ranking results. In an embodiment, an advanced click model is used as the second-stage ranking but other quality metrics may be used, such as similarity to other content, average dwell time of other users, etc. At the second stage, because the number of candidate is pruned significantly, a more computationally intensive and more complex model may be used such as a complex ranking and blending functions using GMP or GBDT. Some ranking objectives/metrics in such a ranking involve predicted CTR, predicted User-dwell-time, and document diversity, can be computed at the stage. In an embodiment, the system may also utilize an advanced click model with multiple CTR aggregations from fast feedback data. Further, in an embodiment, for second-stage ranking, a combination model is used to merge all ranking evidence together to create a final recommended content list. In an embodiment, a third phase ranking occurs on the results of the stage 2 ranking. The third phase may be a rules based filtering to de-duplicate the documents, based on similarity or time, it may also employ other rule based filtering, such as no adult content or no content from a specific source. After the third phase is complete a personalized content stream may be delivered to the user.

The present disclosure relates to a new platform of personalized content recommendations. The personalized recommendations take into consideration a series of user criteria, including but not limited to a user's reading interests, a user's search interests, a user's self identified criteria, a user's social media interactions, a user's electronic mail, and a user's interactions with other third party applications.

For a good recommendation system, it is important to find the user relevant and interesting contents to keep the user engaged. As a first step, it is therefore critical to identify good indicators or signals that represent the a user interest. Signals may be derived from numerous sources. There are the "self declared" interest, which a user may specify in a profile, by way of a user profile or other account on the system. For example, when creating an e-mail account or subscribing to other on-line content like Yahoo! Finance, the user may be prompted to indicate certain personal information about themselves by means of multiple entry of keywords or topics.

Good indicators may also be found when a user visits a portal page, such as Yahoo! Sports and writes a comment on the content. Such positive user actions likely indicate a strong interest in the subject. It is to be noted that a user's likes and interest may vary over time and may be viewed as short term and long term. Accordingly, a user profile needs to be constantly update, refined and developed in order to ensure that short term interests do not overshadow long term interests which are needed to deliver quality personalized content to a user in the long term, i.e., intuitively, a user's reading interest should be long-term, that is to say, a user who is interested in finance will want to visit finance pages frequently. A good third source indicator is a user's queries in search. Such queries, are often a good indicator of short-term interests, but over time may evidence a long term interest, especially when the user repeats the same search query numerous times. User may use search instead of book marking content, so that they may habitually enter the same search terms, i.e., weather, or sports team name, these types of "bookmark" searches are good indicators of a user's long term interest.

Another good indicator of a user's interests are the user's interactions or comments or sharing of a user's friends on social network websites, like Twitter and Facebook. These are good signals of the user's potential long term interests. Specifically, if a user follows certain categories on Twitter or likes a specific page on Facebook, these are usually good indicators of the user's long term interests. Other sources of information used to model a good user profile may also include such things as user demographics, which may be determined by the system, such as the user's location, when does the user log on to the system, or may be supplied by the user directly or from the user's actions, i.e., the user's age and gender are likely easy to determine based on the user's actions. All this information about the user needs to be qualified and stored in the user's profile. And in the case of the inferred information on subject for the user from their viewing habits and social media activities, these actions can be mapped directly into a topical taxonomy or index to better narrow down the user's interests. The index may be a widely used classification system like Wikipedia which may have hundreds of thousands of categories or it may be a taxonomy created to categorize interests which may have hundreds or thousands of topics or subtopics. In some embodiments, both a Wikipedia type index and category taxonomy are used to classify a user's topical interests.

Users' activity data is another valuable data source for user segment model. First, the new activity data can be used to compute new features for behavioral targeting model. For rule-based segments, the new activity data can be used to construct new conditions for user segment definition. For example, advertisers may target those users who recently read articles from a given category with the new system.

In an embodiment, user indicators or signals from different sources are stored separately rather than aggregating them into one profile. For example, a user's short-term interest may be very different with long-term interest. If both were to be combined, they may dilute each other if they are merged into one interest vector.

All the user signals are in a form of raw text. Keywords will be extracted from the raw texts. Category or topic can be inferred from extracted keywords which are then mapped into a taxonomy and wiki index. Further, in an embodiment, the system may use an advertising taxonomy to place the user in a category outputted by behavioral targeting model, Once a user's interests are identified by keywords, their relevancy in the user's profile needs to be modeled to represent the user's interests. Following vector space modeling (VSM), a user's interest is converted into a multidimensional vector in the relevant space. In an embodiment, the space may be a keyword, a category id in a taxonomy, a topic id etc., or a combination thereof. Once the key terms are identified, the user's inferred characteristics and social media profiles maybe converted to a collection of keywords or category ids, or topic ids. that will also be mapped into an index and taxonomy, which may then be converted into a vector.

In the vector space model, the vector represent either the user's interests to the content of the documents (and any objects, in general) as vectors of identifiers, such as, for example, index terms based on the wiki index and the subject taxonomy. The information from the user's viewing and subjects from social media, once indexed may be represented as vectors: $d_j=(W_{1,j}, W_{2,j}, \ldots W_{t,j})$ and $q=(W_{1,q}, W_{2,q}, \ldots W_{t,q})$ Each dimension of the vector corresponds to a separate term. If a term occurs in the document, its value in the vector is non-zero. In this way, a user's profile grows into a multidimensional vector based on the user's interest in the content the user views or shows an interest in.

Once a user vector space is computed, it is constantly updated as the user's behaviors are monitored. To map the user's interest identified in the user profile to relevant content, the potential content itself must be mapped into the same vector space by tokenization, name entity recognition, machine learned categorization, or latent topic inference. Moreover, in an embodiment, different feature space can be built into different channels, and final results may be a combination of different channels with weights applied to the different vector space. In an embodiment, a cosine-similarity based relevance model may be used to evaluate the relevancy of each document to each user's profile.

In an embodiment, as with the user profile, content, such as articles, URLs, blogs, media, etc. needs to be tokenized, categorized, inferred. Similarly, images and video may be indexed based on meta-text or metadata or by using the video or image content itself. To do so, the content is passed through the content processing pipeline which may extract all the key terms from a document. Once key terms have been identified, a concept/content analyzer 145, and a content taxonomy 165 and online index or concept archive 115 like Wikipedia may be used to build a vector in similar space to the user profile. A vector is built for each piece of content considered and a content pool 135 is created. Content pool 135 is constantly updated and feed with new content from a content generation/update unit 140 to ensure fresh high quality content. Further, in addition to creating a content vector for each piece of content, the content needs to be evaluated on its quality or ranking.

A documents ranking or quality relates to several factors associated with the document itself. Because of the vast size of the content stream, there needs to be a method of how to rank contents and only show the limited top-n contents on pages. In an embodiment of the present disclosure, a multiphase ranking process is employed. This ranking may be done based on the content, relevancy and quality of the document itself. In an embodiment, it is expected that a system may process approximately 200,000 to 750,000 pieces of content a day, with 500,000 being preferred. This results in a working set of content from about 5,000,000 to 10,000,000 pieces of content, and preferably 7,000,000 items in the content pool.

Ranking the quality of a document is not related to content per se, but is instead related to how other users have used, viewed, or received the document. A measure of a documents quality may be the click-through-rate (CTR) of other users to a hyperlink outputted by a recommendation system. CTR may be a simple measure of other users' engagement with the content. User dwell time, if used, may be a better metric than CTR. By collecting user dwell time form a wide variety of users on a particular piece of content, a good indication of content quality may be determined.

Similarly, "Like it/Comment it/Share it" on social networks, like Facebook, and Twitter actions are good indicator for user engagement with specific content. While lack of these signals with respect to specific content does not mean users are not engaged even they do take the actions. So events with these signals are positive indicators of the quality of the content, but events without the signals may not indicate negative treatment of the content. Another indicator of the quality of content is the freshness or timeliness of the content. This is a especially true for news recommendation. Trending, although similar to timeliness indicates a different quality standard. For example, although two articles may have the same timestamp, an article about a famous movie star will be more popular than an article about a common person. This notion of trending or vitality that an article becomes popular in time may be an indicator pr quality. Social network website signals may be a good indicator of such trending and vitality.

Topic diversity is also a good indicator of article quality. As the system strives to provide personalized content, it is not in the user's interest to provide only content on a few topics or duplicative content. If all contents is similar or even duplicated, it will definitely bore end users. Users may desire content on a single topic from varying viewpoints or opinions. Therefore a good indicator of content quality is the diversity of the content to from different sources to provide the user with varied interests.

In an embodiment, all or some of these quality indicator may be mapped to a vector and go into forming the content index for each piece of content in the content pool. Accordingly, for each piece of content, there may be associated a content vector as well as a quality vector which is utilized in the ranking process.

In an embodiment, content vectors are computed for all content in the content pool, and user vectors are computed for all user profiles. Once this information is available, personalization module 100 must generate a reasonable amount of content to deliver to user 105. In an embodiment, content ranking unit 210 may be a multi-stage ranking unit. The benefit of utilizing multistage ranking is that it allows, at the first stage, the huge content pool (approximately 7,000,000 pieces of content) to be parsed down to a manageable size pool of potential relevant data. By focusing on the dot product of the user profile vector and the content vector, the system is able to process large amounts of data quickly and easily.

First phase ranking may be an inverted index based retrieval. Based on it, a matching score between a profile and a document in the content pool is computed by a dot-product of a query feature vector based on the user profile and a document feature vector. In an embodiment, all contents in the document pool are evaluated. The phase 1 ranking will return hundreds of content candidates for second-phase processing. In an embodiment, rather than evaluating all content on the content pool, a personalized content pool for the specific user may be built based on other characteristics and user profile models. In an embodiment, phase 1 ranking, may include in addition to content-based matching, a performance-based matching. component as well. Phase 1 ranking may be performed in parallel with the entire content pool and separated over a wide number of processors to increase speed of processing. The phase 1 content-based matching, utilizes the dot product with article length normalization and user features length normalization. The dot product, or scalar product takes the two equal-length normalized vectors and returns a single number. This operation can be defined either algebraically or geometrically. Algebraically, it is the sum of the products of the corresponding entries of the two sequences of numbers. Geometrically, it is the product of the magnitudes of the two vectors and the cosine of the angle between them.

In an embodiment, phase 1 ranking may be a weighted logical AND that use the probability of matching instead of complete match, i.e., it is a hashed match. In an embodiment, three dot product scores may be computed:

1) For declared user charachteristics—
Declared_pos_dotproduct=User_declared_pos*A/(doc_adj*scale_pos_declared);
2) For the user's Social media interests—
FB_score_dotproduct=User_FB*A/(doc_adrscale_FB)
3) For user interest inferred from user viewing habits—
Inferred_score_dotproduct=User_inferred*A/(doc_adj*scale_inferred)
Where: User_declared_pos=user's declared interests; A=document content vector; doc_adj=number of features (taxonomy/wiki) in the current document; scale_pos_declared=proflie scale adjustment parameter; User_FB=profile vector from social media interests; Scale_FB=proflie scale adjustment parameter; User_inferred=profile vector from inferred interests.

In another embodiment, phase 1 ranking involves the dot product between the average user profile and the document rather than computing three individual dot products for each document, The average profile score may be computed by accounting for the declared_pos_interests, the social_media_score_interests, and the inferred_score_interests, all weighted together and then computed against the content vector. Once computed, the simple_profiles_score=ave_profile*A.

The difference between phase 1 and phase 2 ranking is that phase 1 ranking focuses on the dot product of the two vectors and leverages the simplicity of the dot product operation as much as possible, while phase 2 ranking calculates more computationally intensive scores based on the quality parameters of the content and my use machine learning or GBDT processing.

Phase 1 and phase 2 ranking may be done in parallel or sequentially based on the available computing power. In an embodiment, phase 1 ranking was completed utilizing parallel processing before moving on to phase 2 ranking. The phase 2 ranking was also done in parallel and proceeded phase 3 ranking. Phase 3 ranking is done after the completion of phase 2 ranking and cannot be done in parallel as it must be applied to all documents left to be delivered as personalized content.

After phase 1 ranking, phase 2 ranking is utilized to finally determinate what contents will be selected from the hundreds of candidates and recommended to end users. During this ranking stage, a performance score based on a Gamma Poisson (GMP) distribution, machine learning or GBDT, will be computed. Because the number of candidate in the content pool is pruned significantly, the system may employ more expensive computation and more complex models such as GMP, Baysian distribution, GBDT and machine learning. Some ranking/quality metrics such as predicted CTR, predicted User-dwell-time, diversity, can be computed at the stage. In an embodiment, advanced click modeling with multiple CTR aggregations from fast feedback data, can be employed. Moreover, for phase 2 ranking, the system needs a combination model to merge all ranking evidence together to create a pool to pass on for phase 3 ranking.

Phase 3 ranking may be an application of a set of predefined editorial rules to remove duplicate content, or restricted content from the final content stream. After phase 3 ranking is utilized, the personalized content is delivered to the end user 105.

Figure 12:
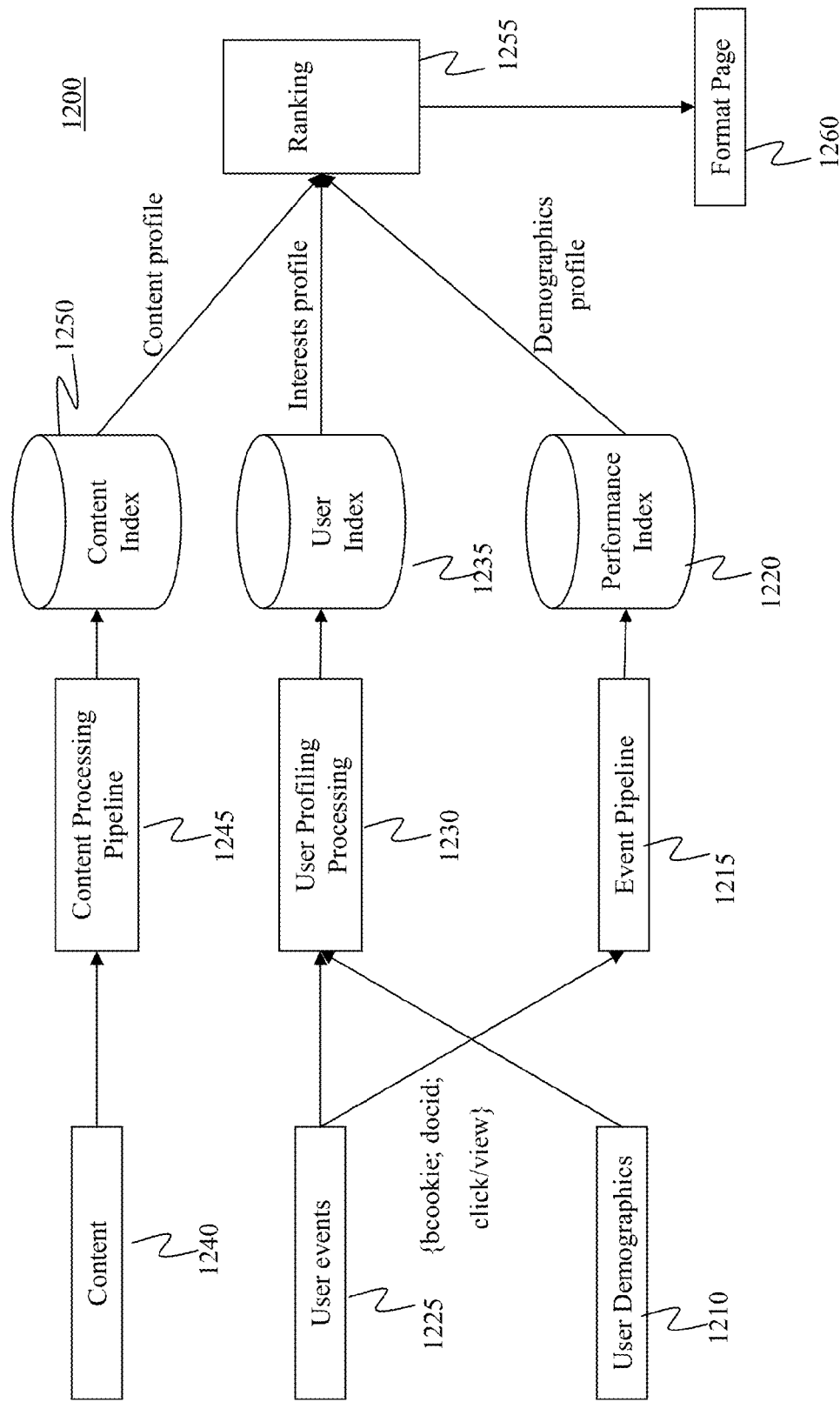
FIG. 12 depicts an embodiment of a personalization system with a content ranking system in accordance with the present disclosure.

FIG. 12 depicts an overview of the ranking process that may be employed in content ranking unit 210 in an embodiment of the present disclosure. System 1200 comprises three different paths leading up to ranking module a55, a content path, a user profile path, and a content quality path. Event pipeline 1215 is fed by user events 1225 and generates a performance index 1220. User event stream 1225, user demographics file 1210, user profile processing 1230 and user index 1235. Content stream 1240, content processing pipeline 1245 and content index 1250.

Content stream 1240 may included articles, text, websites, blogs, audio, video or any other form of digital on-line content. This feeds into content processing pipeline 1245 where the content is extracted as text and mapped to a taxonomy and indexed wiki to create a multi-dimensional content vector. Additionally as part of the content processing other user events related to content are fed into event pipeline 1215, the quality of the document is computed and sent to performance index 1225. During the ranking process in module 1255, the contents quality as well as the content subject are used to rank a user's interest in specific content. User event stream 1225 receives all the user's interactions with web sites, text, audio, video, social networks, etc. These events are passed on to user profiling process 1230 and event pipeline 1215. For each specific user, the user's content preferences are mapped to a topic taxonomy and a wiki index for creating a multi-dimensional user profile vector. For user events in general, they are passed to the event pipeline where they are used to establish the quality of the documents.

Content index 1250, user index 1235 and performance index 1220 all feed into ranking module 1255. Ranking module 1255 may perform a three phase ranking of each document in the content index, with the highest rated documents being sent to the user to format the page 1260. It is understood, that the actual content could be cached and sent to the user as part of formatted page 1260 or a link to a particular document could be sent.

The three phase ranking, in an embodiment, involves a first phase, where the dot product of the normalized user profile vector and the normalized content vector are used to reduce the number of potential pieces of content from the content index. The reduction is based on a threshold score for each document vs. user profile that results from the dot product computation. The second phase or phase 2 ranking utilizes the reduced set of document and applies a more computationally intensive criteria. A machine learning, Bayesian, GBDT or GMP distribution may be used. The performance index 1220 of the remaining documents maybe set to a threshold, where only the highest quality documents may be selected based on CTR, dwell times, diversity, etc. As part of a third phase ranking, a final set of rule base filters may be applied to the remaining set of document which are then output to as a formatted page 1260. It is to be understood, that this process is continually or periodically being performed as new content and new user events are recorded and added to the content index 1250 and user index 1235 and performance index 1220. For example, a piece of content may initially have a low performance index, but if the content starts to trend, that same piece of content may have a much higher performance index, just 15 minutes. later. In such an example, the content may not be included in the formatted page initially, but when the ranking is re-performed, it may cross the threshold and become a high priority document.

Figure 13A:
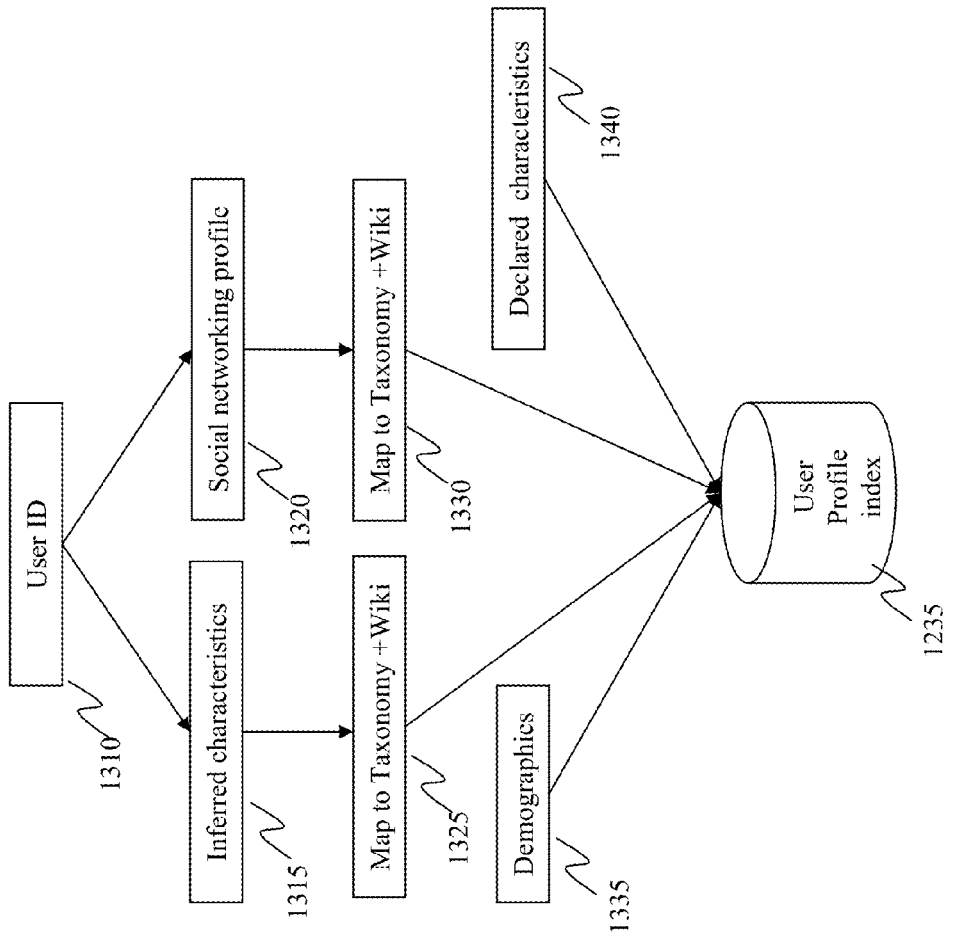
FIG. 13a depicts the inputs used to build a user profile in accordance with an embodiment of the present disclosure.
Figure 13B:
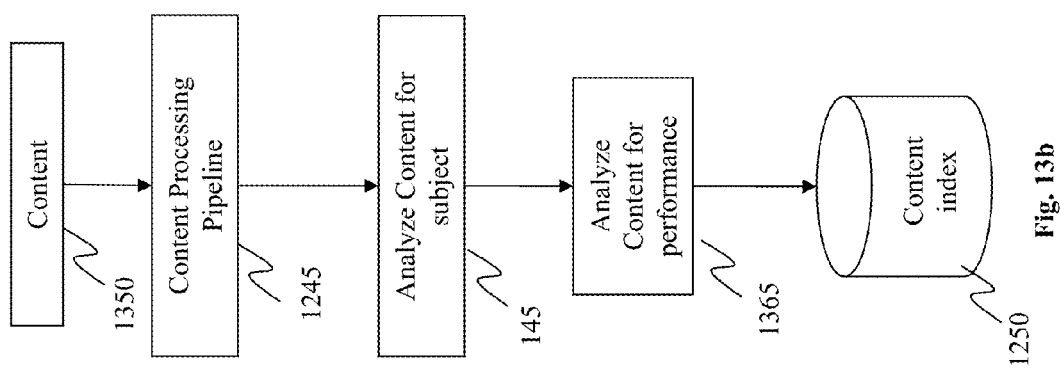
FIG. 13b depicts the inputs used to build a content index in accordance with an embodiment of the present disclosure.

FIGS. 13*a* and 13*b* depict the information used to build the user profile index 1235 and the content index 1250 respectively. As seen in FIG. 13*a*, each user is assigned a user ID 1310, which identifies the use when they first log into the system and tracks the profile. 1310 may have a set of inferred characteristics, 1315 associated with it as well as a social networking profile 1320. Inferred characteristics may be obtained from the type of content the user views or consumes. Inferred characteristics may be gleaned based on text in a document or meta-data associated with a document. Social networking profile 1320 may contain the information the user has shown an interest in on social networking sites. This may include likes, shares, follows, etc., as well as the topics the user shows an interest in. Both the inferred characteristics 1315 and the social networking profile 1320 are mapped to a taxonomy, for example based on subject matter as well as a category index such as Wikipedia. These mapped results will create two separate multi-dimensional vectors based on the taxonomy and the wiki mapping. In addition there may be user demographics, such as location, gender, age, time of use, which will be added to the user profile index 1235 but not the vectors. Similarly, user declared characteristics 1340, generated by the user themselves, such as when they create an account may be added to the user profile index 1235. All four of these pieces of information may be used to build the user profile for a specific user and associated with user ID 1310.

Input for content index 1250 is shown in FIG. 13*b*. Content stream 1350 is fed into processing pipeline 1245 where the content is analyzed for subject at concept/content analyzer 145 and a multidimensional vector created. Content 1350 may also be analyzed for performance at 1365. Both the performance and the content associated with the document are then stored in content index 1250.

Figure 14:
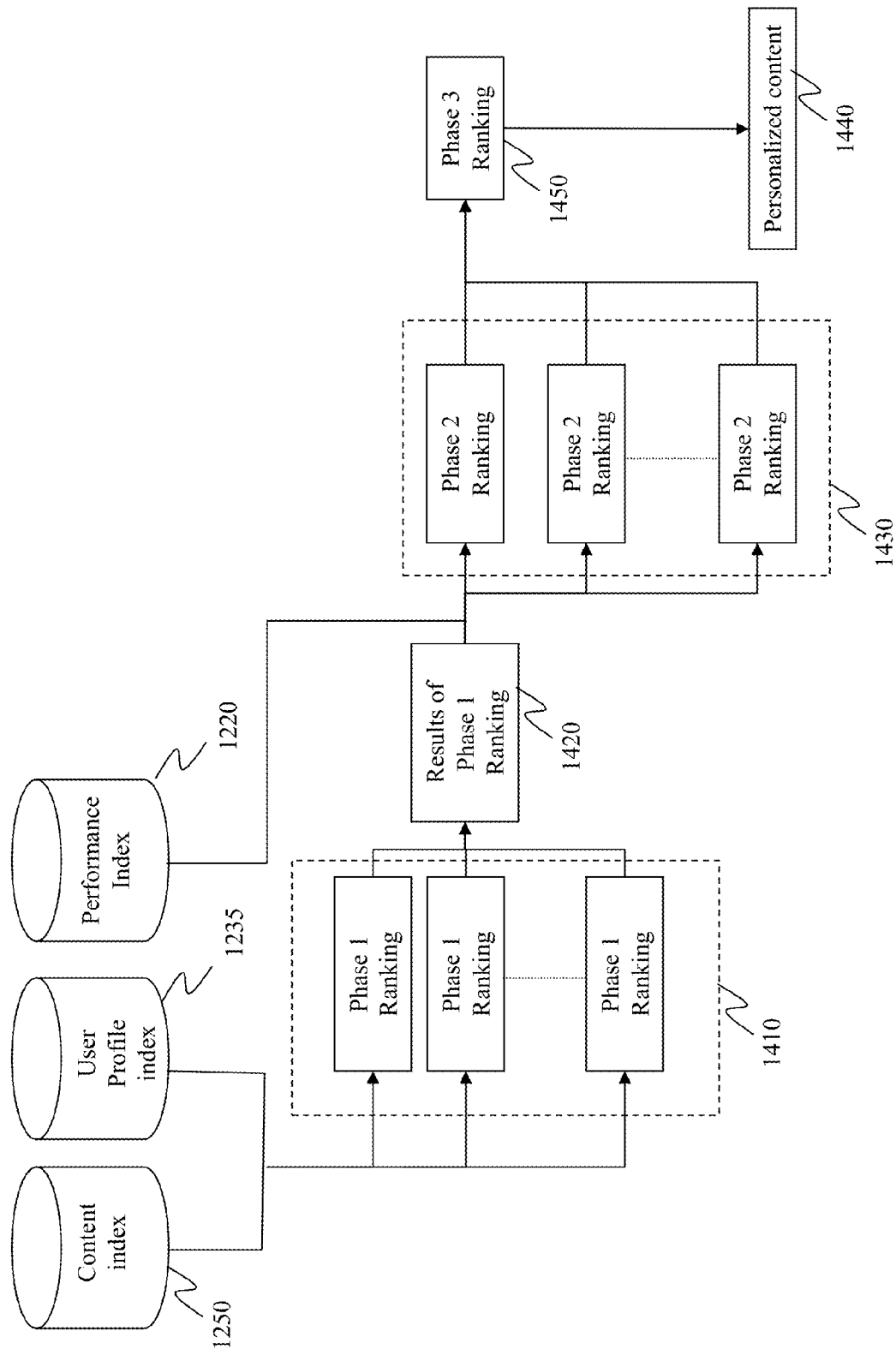
FIG. 14 depicts a ranking and content ranking unit for a personalization system in accordance with an embodiment of the present disclosure.

FIG. 14 depicts a three phase ranking process in an embodiment of the invention. Content index 1250 and user profile index 1235 provide multidimensional vectors to phase 1 ranking 1410. Phase 1 ranking 1410 may be performed in parallel processes or serially. During phase 1 ranking, the dot product of each element in the profile vector is computed against the content vector for each document. Parallel processing greatly reduces computational time for the large quantity of content stored in content index 1250. The dot product of the content and user profile vectors are compared to a threshold and only a candidate set of document is returned in the results phase 1 ranking 1420. The content in 1420 is processed against the contents performance vector for each document stored in performance index 1220. This process may include machine learning or other processing. The phase 2 ranking 1430 may also be done in parallel to speed up processing. Although phase 2 ranking is computationally intensive because of the characteristics associated with document performance, the reduced content set makes such processing possible. Accordingly, a GMP, Bayesian, GBDT or machine learning may be performed. The output of the phase 2 ranking is passed to phase 3 ranking 1450 which applies a filter to the content in series. This filtering of phase 3 is intended to remove prohibited or duplicative documents from the phase 2 ranking set. Once phase 3 filtering is completed, personalized content 1440 is presented to the user. The two-phase weighted AND processing of phase 1 and phase 2 permit fast evaluation, in the vector space of the large corpus of content. This use of the document content in phase 1 and then the more computationally expensive Bayesian, GBDT, or machine-learned model of phase 2 is used to re-rank the documents in an efficient and timely manner.

Figure 15:
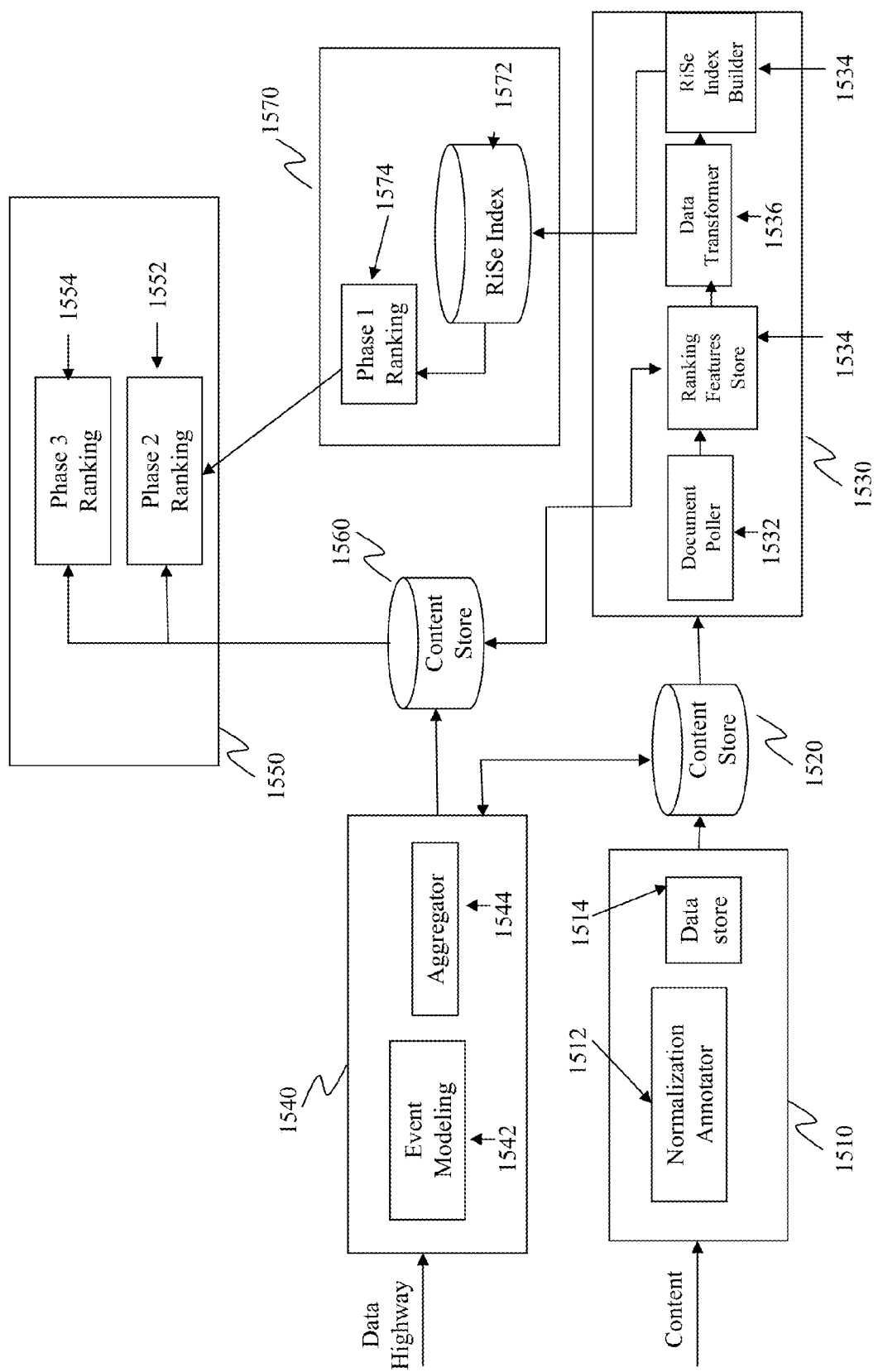
FIG. 15 depicts a ranking and content ranking unit for a personalization system in accordance with an embodiment of the present disclosure.

FIG. 15 discloses an embodiment of the present disclosure. Content pipeline 1510 contains normalizer annotator 1512 and database 1514. Normalization annotator 1512 may be used to calculate the length normalizer for each article or piece of content. database 1514 may be used to store content. Content feature pipeline 1540 contains event modeling module 1542 and aggregator 1544. Event modeling module 1542 may be a GMP modeling module that calculates the GMP score for input related to the content based on user events such as CTR, dwell time, etc. Aggregator 1544 may be used to group content into groups such as trending content or timely content or content most interesting to males between 18-25. These grouped articles may be passed to content store d60 which may be a memory cache that stores the top rated articles by groups.

All content passing through content pipeline 1510 will be placed and stored in content 1520. From content store 1520 the content will pass to index builder 1530. Index builder 1530 contains document poller 1532, ranking features store d34, data transformer 1536 and a rapid indexing search engine 1538. Document poller 1532 is a data dump from content store 1520 and is utilized for index building. Ranking features store 1534 accepts input from content feature pipeline 1540 and stores the performance indicator for each associated piece of content. Data transformer 1536 converts content features to rapid indexing search engine 1538 recognized format utilizing length normalizes and feature weights. D38 builds an index and stores it in 1572 index in module 1570. Once all indexes are in RiSe index 1574 phase 1 ranking 1574 is computed as described above, based on the dot product of the user profile vectors and the content vector. Once phase 1 ranking 1574 is completed, those results are passed to phase 2 ranking in scoring server 1550. Scoring server 1550 performs phase 2 ranking 1552 and phase 3 ranking 1554. After phase 3 ranking, a personalized content stream is passed to the end user.

Figure 16:
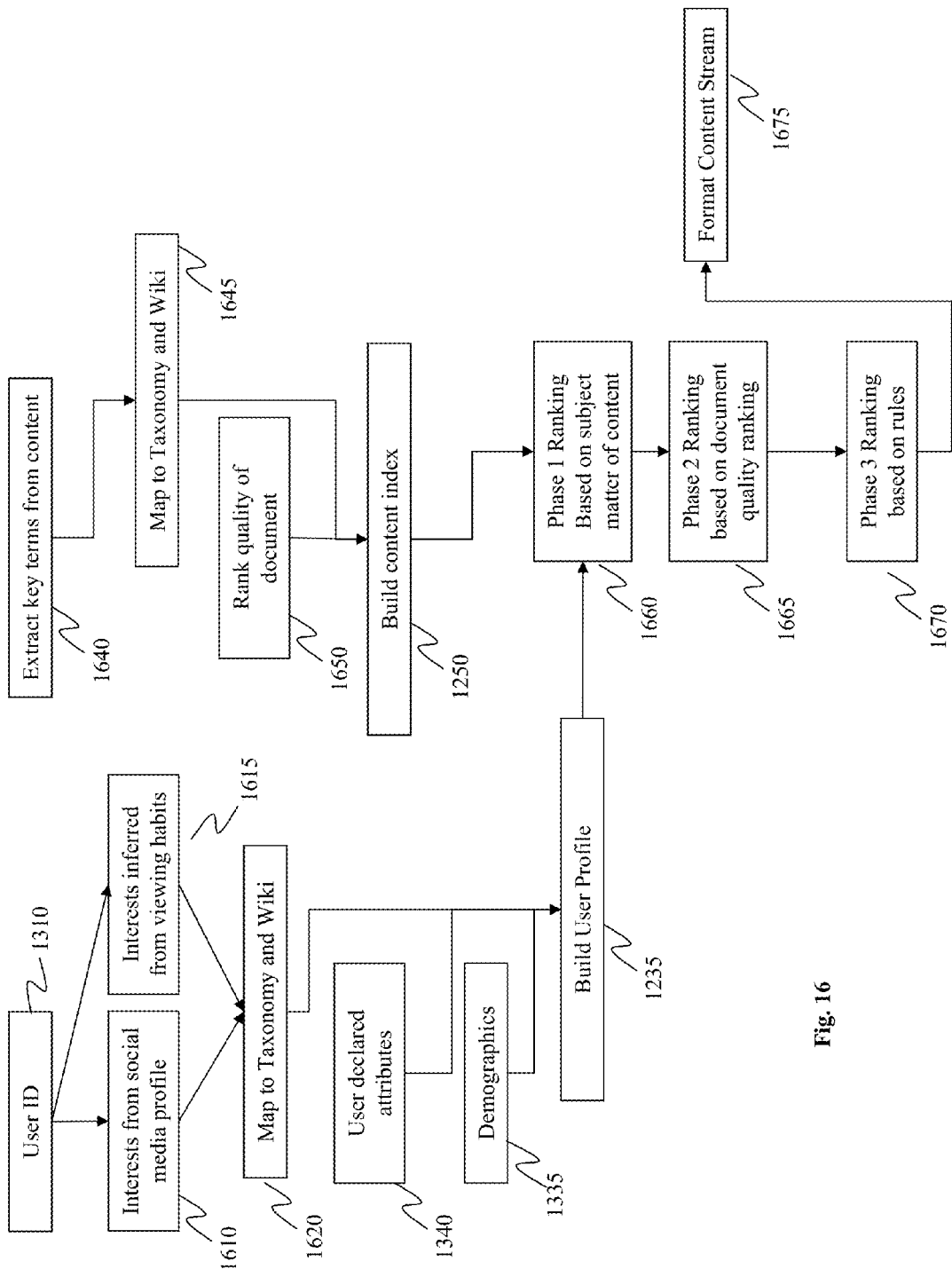
FIG. 16 depicts a ranking and content ranking unit for a personalization system in accordance with an embodiment of the present disclosure.

FIG. 16 depicts another representation of an embodiment of the present system for ranking personalized content. Similar reference numbers indicate similar components and functionality User ID 1310 provides information on user 105 and at 1610 identifies user's interests from social media habits. At 1615, the user's inferred interest are obtained base don viewing habits. The social media interests 1610 and inferred interests 1615 are mapped to content taxonomy 165 and knowledge archive 115 at 1620. At 1340, the user declared attributes are combined with the demographics 1335 and all are used to build user index 1235.

In parallel, on the content side, at 1640 the key terms form the content is extracted and mapped to mapped to content taxonomy 165 and knowledge archive 115 at 1645. The rank quality of the document is computed at 1650 and combined with the mapped content taxonomy 165 and knowledge archive 115 at 1250 to build the content index. The user profile from 1235 and the content index from 1250 are inputted into phase 1 ranking at 1660. After phase 1 ranking is completed and a reduced set of content is produced, phase 2 ranking is performed base don content quality at 1665. At 1670, the results of phase 2 ranking is passed to phase 3 ranking for dedupping, and applying filter rules at 1675, the multi-phase ranked document stream is formatted for presentment to the user 105.

To implement the present teaching, computer hardware platforms may be used as the hardware platform(s) for one or more of the elements described herein. The hardware elements, operating systems, and programming languages of such computers are conventional in nature, and it is presumed that those skilled in the art are adequately familiar therewith to adapt those technologies to implement the processing essentially as described herein. A computer with user interface elements may be used to implement a personal computer (PC) or other type of work station or terminal device, although a computer may also act as a server if appropriately programmed. It is believed that those skilled in the art are familiar with the structure, programming, and general operation of such computer equipment and as a result the drawings should be self-explanatory.

Figure 17:
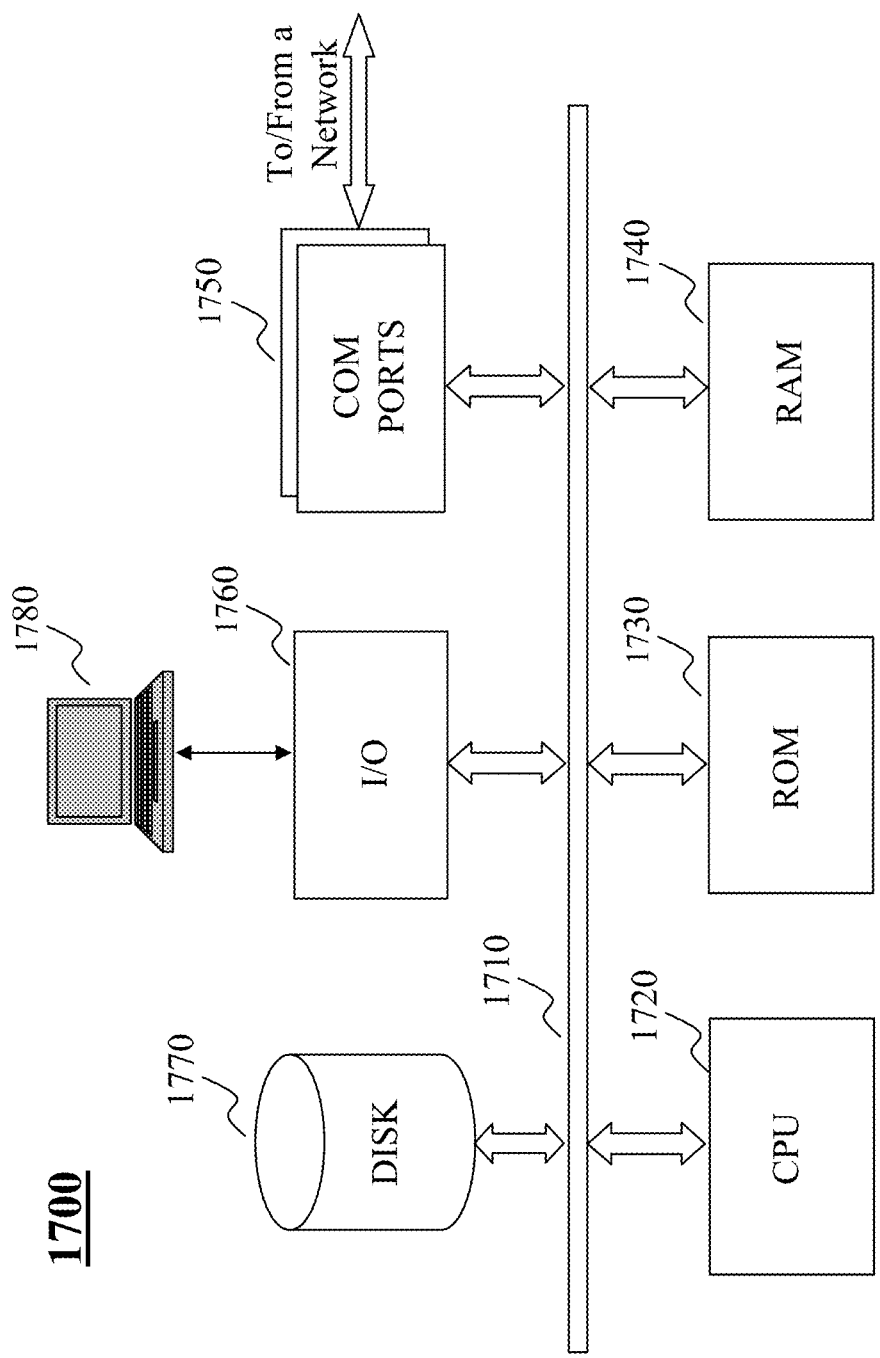
FIG. 17 depicts a general computer architecture on which the present teaching can be implemented.

FIG. 17 depicts a general computer architecture on which the present teaching can be implemented and has a functional block diagram illustration of a computer hardware platform that includes user interface elements. The computer may be a general-purpose computer or a special purpose computer. This computer 3000 can be used to implement any components of the multi-phase ranking of personalized content architecture as described herein. Different components of the system in the present teaching can all be implemented on one or more computers such as computer 3000, via its hardware, software program, firmware, or a combination thereof. Although only one such computer is shown, for convenience, the computer functions relating to the target metric identification may be implemented in a distributed fashion on a number of similar platforms, to distribute the processing load.

The computer 1700, for example, includes COM ports 1702 connected to and from a network connected thereto to facilitate data communications. The computer 1700 also includes a central processing unit (CPU) 1704, in the form of one or more processors, for executing program instructions. The exemplary computer platform includes an internal communication bus 1706, program storage and data storage of different forms, e.g., disk 1708, read only memory (ROM) 1710, or random access memory (RAM) 1712, for various data files to be processed and/or communicated by the computer, as well as possibly program instructions to be executed by the CPU. The computer 1700 also includes an I/O component 1714, supporting input/output flows between the computer and other components therein such as user interface elements 1716. The computer 1700 may also receive programming and data via network communications.

Hence, aspects of the method of multi-phase ranking of personalized content, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the implementation of various components described above may be embodied in a hardware device, it can also be implemented as a software only solution. In addition, the components of the system as disclosed herein can be implemented as a firmware, firmware/software combination, firmware/hardware combination, or a hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method implemented on a machine having at least one processor, storage, and a communication interface connected to a network for selecting content, the method comprising:
    obtaining a user profile of a user characterizing the user's interests;
    obtaining a content profile for each piece of content in a first set of content and a content quality indicator characterizing quality of the piece of content in the first set of content;
    estimating an affinity measure between each piece of content in the first set of content and the user based on the user profile and the content profile for the piece of content;
    selecting a second set of content from the first set of content based on the affinity measures for the pieces of content in the first set of content, wherein the second set is a subset of the first set;
    selecting a third set of content from the second set of content based on the content quality indicators and a plurality of contextual parameters including a type of content associated with each piece of content in the second set of content, wherein the content quality indicator of each piece of content is obtained based on engagement of other users with the piece of content and vitality of the piece of content, and wherein the third set is a subset of the second set;
    filtering the third set of content based on the plurality of contextual parameters to generate a fourth set of content; and
    outputting the fourth set of content on a device operated by the user.

2. The method of claim 1, wherein
    the selecting the second set of content from the first set of content is based on a first model; and
    the selecting the third set of content from the second set of content is based on a second model.

3. The method of claim 2, wherein
    the user profile and the content profile are represented by feature vectors, respectively; and
    the first model is based on a product of the respective feature vectors of the user and of a piece of content.

4. The method of claim 2, wherein the second model includes at least one of:
    a statistic distribution;
    a machine learning model; and
    a decision tree.

5. The method of claim 1, wherein the user profile, content profile, and the content quality indicator are dynamically updated.

6. The method of claim 1, wherein the user profile is obtained based on at least one of:
    the user's declared interests;
    the user's content consumption;
    the user's online behaviors; and
    the user's demographic information.

7. The method of claim 1, wherein the content quality indicator is obtained based on at least one of:
    timeliness of the piece of content; and
    diversity of the piece of content.

8. The method of claim 1, wherein the plurality of contextual parameters further includes a source of the content, a type of device used by the user to access the content, and a bandwidth of a network over which the content is delivered to the user.

9. A system having at least one processor, a storage, and a communication platform for selecting content, the system comprising:
    a user profiler configured to obtain a user profiler of a user that characterizes the user's interests;
    a content profiler configured to obtain a content profile for each piece of content in a first set of content and a content quality indicator characterizing quality of the piece of content in the first set of content;
    an estimator configured to estimate an affinity measure between each piece of content in the first set of content and the user based on the user profile and the content profile for the piece of content;
    a first selector configured to select a second set of content from the first set of content based on the affinity measures for the pieces of content in the first set of content, wherein the second set is a subset of the first set;
    a second selector configured to select a third set of content from the second set of content based on the content quality indicators and a plurality of contextual parameters including a type of content associated with each piece of content in the second set of content, wherein the content quality indicator of each piece of content is obtained based on engagement of other users with the piece of content and vitality of the piece of content, and wherein the third set is a subset of the second set;
    a filter configured to filter the third set of content based on the plurality of contextual parameters to generate a fourth set of content; and
    an output configured to output the fourth set of content on a device operated by the user.

10. The system of claim 9, wherein
    the selecting the second set of content from the first set of content is based on a first model; and
    the selecting the third set of content from the second set of content is based on a second model.

11. The system of claim 10, wherein
    the user profile and the content profile are represented by feature vectors, respectively; and
    the first model is based on a product of the respective feature vectors of the user and of a piece of content.

12. The system of claim 10, wherein the second model includes at least one of:
    a statistic distribution;
    a machine learning model; and
    a decision tree.

13. The system of claim 9, wherein the user profile, the content profile, and the content quality indicator are dynamically updated.

14. The system of claim 9, wherein the user profile is obtained based on at least one of:
    the user's declared interests;
    the user's content consumption;
    the user's online behaviors; and
    the user's demographic information.

15. The system of claim 9, wherein the content quality indicator is obtained based on at least one of:

timeliness of the piece of content; and diversity of the piece of content.

16. A non-transitory machine-readable medium having information recorded thereon for selecting content, wherein the information, when read by the machine, causes the machine to perform the following:

obtaining a user profile of a user characterizing the user's interests;

obtaining a content profile for each piece of content in a first set of content and a content quality indicator characterizing quality of the piece of content in the first set of content;

estimating an affinity measure between each piece of content in the first set of content and the user based on the user profile and the content profile for the piece of content;

selecting a second set of content from the first set of content based on the affinity measures for the pieces of content in the first set of content, wherein the second set is a subset of the first set;

selecting a third set of content from the second set of content based on the content quality indicators and a plurality of contextual parameters including a type of content associated with each piece of content in the second set of content, wherein the content quality indicator of each piece of content is obtained based on engagement of other users with the piece of content and vitality of the piece of content, and wherein the third set is a subset of the second set;

filtering the third set of content based on the plurality of contextual parameters to generate a fourth set of content; and outputting the fourth set of content on a device operated by the user.

17. The non-transitory machine-readable medium of claim 16, wherein the selecting the second set of content from the first set of content is based on a first model; and the selecting the third set of content from the second set of content is based on a second model.

18. The non-transitory machine-readable medium of claim 16, wherein the user profile, the content profile, and the content quality indicator are dynamically updated.

* * * * *